(12) United States Patent
Kida et al.

(10) Patent No.: US 9,115,290 B2
(45) Date of Patent: *Aug. 25, 2015

(54) PHOTOCURABLE INK COMPOSITION FOR INK JET RECORDING AND INK JET RECORDING METHOD

(75) Inventors: Hiroaki Kida, Nagano (JP); Hiroshi Fukumoto, Nagano (JP); Toru Saito, Nagano (JP); Keitaro Nakano, Nagano (JP); Hiroki Nakane, Nagano (JP)

(73) Assignee: Seiko Epson Corporation, Shiojiri-Shi (JP)

( * ) Notice: Subject to any disclaimer, the term of this patent is extended or adjusted under 35 U.S.C. 154(b) by 276 days.

This patent is subject to a terminal disclaimer.

(21) Appl. No.: 13/544,539

(22) Filed: Jul. 9, 2012

(65) Prior Publication Data

US 2013/0010039 A1 Jan. 10, 2013

(30) Foreign Application Priority Data

Jul. 8, 2011 (JP) ................................. 2011-151770
Sep. 14, 2011 (JP) ................................. 2011-200809
Jan. 19, 2012 (JP) ................................. 2012-008704

(51) Int. Cl.
*B41J 2/01* (2006.01)
*C09D 11/101* (2014.01)
*B41J 2/21* (2006.01)
*C09D 11/322* (2014.01)
*B41J 11/00* (2006.01)

(52) U.S. Cl.
CPC ............. *C09D 11/101* (2013.01); *B41J 2/2107* (2013.01); *C09D 11/322* (2013.01); *B41J 11/002* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ......... 347/100, 95, 102, 88, 99, 96, 21, 20, 9, 347/105, 101; 106/31.27, 31.13, 31.6; 523/160, 161
See application file for complete search history.

(56) References Cited

U.S. PATENT DOCUMENTS

| | | |
|---|---|---|
| 4,507,466 A | 3/1985 | Tomalia et al. |
| 4,558,120 A | 12/1985 | Tomalia et al. |
| 4,568,737 A | 2/1986 | Tomalia et al. |
| 4,587,329 A | 5/1986 | Tomalia et al. |
| 4,631,337 A | 12/1986 | Tomalia et al. |
| 4,694,064 A | 9/1987 | Tomalia et al. |
| 5,041,516 A | 8/1991 | Frechet et al. |
| 6,023,547 A | 2/2000 | Tortorello |
| 6,310,115 B1 | 10/2001 | Vanmaele et al. |
| 6,767,980 B2 | 7/2004 | Yurugi et al. |
| 6,913,352 B2 | 7/2005 | Yoshihiro et al. |
| 6,966,643 B2 | 11/2005 | Hale et al. |
| 7,396,861 B2 | 7/2008 | Loccufier et al. |
| 7,507,773 B2 | 3/2009 | Loccufier et al. |
| 7,507,785 B2 | 3/2009 | Vanmaele et al. |
| 7,538,144 B2 | 5/2009 | Vanmaele et al. |
| 7,795,324 B2 | 9/2010 | Loccufier et al. |
| 7,803,851 B2 | 9/2010 | Ishibashi et al. |
| 7,875,698 B2 | 1/2011 | Vanmaele et al. |
| 7,931,827 B2 | 4/2011 | Schneider et al. |
| 8,158,214 B2 | 4/2012 | Fukumoto et al. |
| 8,192,804 B2 | 6/2012 | Fukumoto et al. |
| 8,470,904 B2 | 6/2013 | Sato et al. |
| 2002/0065335 A1 | 5/2002 | Noguchi et al. |
| 2002/0149659 A1 | 10/2002 | Wu et al. |
| 2003/0199655 A1 | 10/2003 | Yurugi et al. |
| 2004/0141040 A1 | 7/2004 | Nakajima |
| 2004/0145639 A1 | 7/2004 | Noutary |
| 2004/0166249 A1 | 8/2004 | Siegel |
| 2006/0158493 A1 | 7/2006 | Nakano et al. |
| 2006/0160917 A1 | 7/2006 | Oyanagi et al. |
| 2007/0129457 A1 | 6/2007 | Nakano et al. |
| 2007/0211111 A1 | 9/2007 | Hayata |
| 2007/0249750 A1 | 10/2007 | Oyanagi et al. |
| 2008/0081119 A1 | 4/2008 | Oyanagi et al. |
| 2008/0090930 A1 | 4/2008 | Madhusoodhanan et al. |

(Continued)

FOREIGN PATENT DOCUMENTS

| | | |
|---|---|---|
| CN | 101163758 A | 4/2008 |
| CN | 101573387 A | 11/2009 |
| EP | 2 017 311 A1 | 1/2009 |
| EP | 2 053 103 A1 | 4/2009 |
| EP | 2 399 966 A1 | 12/2011 |
| JP | 11-302562 A | 11/1999 |
| JP | 3461501 B1 | 10/2003 |

(Continued)

OTHER PUBLICATIONS

[No Author Listed] High lights! Radiation curing with resins and photoinitiators for industrial coatings and graphic arts: Laromer, Irgacure, Lucirin, Darocur. BASF SE. No publishing date available. 44 pages.

*Primary Examiner* — Manish S Shah
(74) *Attorney, Agent, or Firm* — Nutter McClennen & Fish LLP; John J. Penny, Jr.; Taylor M. Coon

(57) ABSTRACT

The present invention provides a photocurable ink composition for ink jet recording with excellent curability. The photocurable ink composition for ink jet recording includes polymerizable compounds, a photopolymerization initiator, and a colorant, wherein the polymerizable compounds include a vinyl ether group-containing (meth)acrylate represented by general formula (I):

$$CH_2=CR^1-COOR^2-O-CH=CH-R^3 \quad (I)$$

(wherein $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms) and phenoxyethyl (meth)acrylate.

16 Claims, No Drawings

(56) References Cited

U.S. PATENT DOCUMENTS

| | | |
|---|---|---|
| 2008/0108747 A1 | 5/2008 | Nakamura et al. |
| 2008/0166495 A1 | 7/2008 | Maeno et al. |
| 2008/0180503 A1 | 7/2008 | Umebayashi |
| 2008/0200578 A1 | 8/2008 | Noutary |
| 2009/0000508 A1 | 1/2009 | Edison et al. |
| 2009/0041946 A1 | 2/2009 | Fukumoto et al. |
| 2009/0099277 A1* | 4/2009 | Nagvekar et al. ............ 347/100 |
| 2009/0118388 A1 | 5/2009 | Naruse et al. |
| 2009/0197988 A1* | 8/2009 | Kito et al. ................... 522/26 |
| 2009/0280302 A1* | 11/2009 | Fukumoto et al. ............ 347/100 |
| 2010/0048756 A1 | 2/2010 | Loccufier et al. |
| 2010/0133728 A1 | 6/2010 | Yonezawa et al. |
| 2010/0313782 A1* | 12/2010 | Loccufier et al. ............ 101/483 |
| 2012/0069108 A1 | 3/2012 | Oyanagi et al. |
| 2012/0147095 A1 | 6/2012 | Miura et al. |
| 2012/0229583 A1 | 9/2012 | Fukumoto et al. |
| 2012/0252919 A1 | 10/2012 | Suzuki et al. |
| 2012/0274717 A1 | 11/2012 | Nakano et al. |
| 2013/0063535 A1 | 3/2013 | Yoda et al. |
| 2014/0104356 A1 | 4/2014 | Kitade et al. |
| 2014/0160215 A1 | 6/2014 | Saito et al. |

FOREIGN PATENT DOCUMENTS

| | | |
|---|---|---|
| JP | 2004-099796 A | 4/2004 |
| JP | 3544658 B2 | 7/2004 |
| JP | 2004-224841 A | 8/2004 |
| JP | 2004-526820 A | 9/2004 |
| JP | 2006-028518 A | 2/2006 |
| JP | 2006-176734 A | 7/2006 |
| JP | 2006-199924 A | 8/2006 |
| JP | 2006-206875 A | 8/2006 |
| JP | 2006-232989 A | 9/2006 |
| JP | 2007-083509 A | 4/2007 |
| JP | 2007-100054 A | 4/2007 |
| JP | 2007-136988 A | 6/2007 |
| JP | 2007-182536 A | 7/2007 |
| JP | 2007314744 | 12/2007 |
| JP | 2007314775 | 12/2007 |
| JP | 2008-019292 A | 1/2008 |
| JP | 2008-507598 A | 3/2008 |
| JP | 2008120991 A | 5/2008 |
| JP | 2008-179136 A | 8/2008 |
| JP | 2008-280383 A | 11/2008 |
| JP | 4204333 B2 | 1/2009 |
| JP | 2009-057548 A | 3/2009 |
| JP | 2009-062541 A | 3/2009 |
| JP | 2009-096910 A | 5/2009 |
| JP | 2009-226863 A | 10/2009 |
| JP | 2010-157706 A | 7/2010 |
| JP | 2011-500932 A | 1/2011 |
| JP | 2011-502188 A | 1/2011 |
| JP | 2012-207084 A | 10/2012 |
| JP | 2013-053208 A | 3/2013 |
| WO | 03089486 A1 | 10/2003 |
| WO | 2006/085992 A2 | 8/2006 |
| WO | 2009/053305 A1 | 4/2009 |
| WO | 2011/076703 A1 | 6/2011 |
| WO | 2012/172973 A1 | 12/2012 |
| WO | 2012/172974 A1 | 12/2012 |

* cited by examiner

PHOTOCURABLE INK COMPOSITION FOR INK JET RECORDING AND INK JET RECORDING METHOD

BACKGROUND

1. Technical Field

The present invention relates to a photocurable ink composition for ink jet recording and an ink jet recording method using the same.

2. Related Art

Various methods have been used as recording methods for forming images on recording media such as paper on the basis of image data signals. Among these methods, an ink jet method uses a low-cost apparatus and forms images directly on recording media by ejecting inks only to necessary image portions, and thus the ink jet method can efficiently use inks and requires a low running cost. Further, the ink jet method is excellent as a recording method because of its low noise.

In the ink jet recording method, photocurable ink compositions which are cured by light irradiation have recently been used as ink compositions capable of imparting good water resistance, solvent resistance, and abrasion resistance.

For example, Japanese Patent Nos. 3461501 and 3544658 disclose an ink composition containing 2-(vinyloxyethoxy)ethyl (meth)acrylate, at least one of 2-(hydroxyethoxy)ethyl vinyl ether and diethylene glycol divinyl ether, diethylene glycol di(meth)acrylate, and a photopolymerization initiator, and a reactive diluent composition ([0114] and Table 1 in [0139] of Japanese Patent No. 3461501, and Examples and Tables 1 and 4 of Japanese Patent No. 3544658).

For example, Japanese Unexamined Patent Application Publication No. 2009-62541 discloses an ink jet ink containing 69.82 parts by weight of propoxylated neopentyl glycol diacrylate, 10.0 parts by weight of bifunctional vinyl ether monomer (a compound having only a vinyl ether group as a substituent), a radical photoinitiator, and 3.60 parts by weight of a disperse pigment, and having a viscosity at 25° C. of 22 mPas ([0021] and [0022] of Japanese Unexamined Patent Application Publication No. 2009-62541).

For example, Japanese Unexamined Patent Application Publication No. 2008-179136 discloses an ink solution containing 2-(2-vinyloxyethoxy)ethyl acrylate alone or 2-(2-vinyloxyethoxy)ethyl acrylate in combination with isobornyl acrylate, a radical polymerization initiator, a cationic polymerization initiator, a pigment, a dispersant, and a surfactant ([0204] to [0207] of Japanese Unexamined Patent Application Publication No. 2008-179136).

For example, Japanese Unexamined Patent Application Publication (Translation of PCT application) No. 2008-507598 discloses a radiation curable ink jet ink containing 25.8% by weight of hexanediol diacrylate, 4.6% by weight of an amine adduct of tripropylene glycol diacrylate, 2.3% by weight of 2-(2-ethoxyethoxy)ethyl acrylate, 2.5% by weight of alkoxylated phenoxyethyl acrylate, 3.7% by weight of 2-benzyl-2-(dimethylamino)-4'-morpholinobutyrophenone, 3.2% by weight of 2-hydroxy-2-methylpropiophenone, 2.8% by weight of a mixture of trimethylbenzophenone and methylbenzophenone, 0.5% by weight of isopropylthioxanthone, 27.8% by weight of a cyan pigment dispersion solution, and 17.6% by weight of 2-(2-vinyloxyethoxy)ethyl acrylate ([0208] and [0209] of Japanese Unexamined Patent Application Publication (Translation of PCT application) No. 2008-507598).

For example, Japanese Patent No. 4204333 is aimed at achieving excellent active energy ray curability of thin films and discloses a photocurable composition containing 47.5 parts by weight of vinyloxyethoxyethyl acrylate or vinyloxyethoxyethyl methacrylate, 47.5 parts by weight of 4-acryloyloxymethyl-2-methyl-2-methyl-1,3-dioxolane, 15 parts by weight of triethylene glycol diacrylate, and 5 parts by weight of a photopolymerization initiator ([0011], [0081], and [0082] of Japanese Patent No. 4204333).

For example, Japanese Unexamined Patent Application Publication No. 2010-157706 is aimed at providing an imprint curable composition which is excellent in curability in 3 μm-thickness thin films and excellent in pattern accuracy, and discloses an imprint curable composition including 15.4% by mass of a monofunctional acryl monomer, 19.3% by mass of 2-(2-vinyloxyethoxy)ethyl acrylate, 51.3% by mass (total) of bifunctional acryl monomer and trifunctional acryl monomer, 1.0% by mass of a photopolymerization initiator, an antioxidant, a coupling agent, and a surfactant. ([0092] to [0098] and [0100] to [0103] of Japanese Unexamined Patent Application Publication No. 2010-157706).

For example, Japanese Unexamined Patent Application Publication No. 2009-96910 is aimed at providing an active energy ray-curable ink for ink jet printing which has low viscosity at room temperature and is excellent in flexibility of cured films, and discloses an active energy ray-curable ink for ink jet printing containing 2.5 parts by weight of pentaerythritol tetraacrylate, 32.7 parts by weight of diethylene glycol monovinyl ether acrylate, 6 parts by weight of isobornyl acrylate, 22.7 parts by weight of tetraethylene glycol diacrylate, 24.6 parts by weight of N-vinylpyrrolidone, a photopolymerization initiator, a pigment, and a dispersant ([0003], [0069] to [0072], and [0077] of Japanese Unexamined Patent Application Publication No. 2009-96910).

For example, Japanese Unexamined Patent Application Publication (Translation of PCT application) No. 2011-500932 discloses a free radical curable solution (INV-18) prepared by mixing 24.38% by weight of VEEA (2-(vinylethoxy)ethyl acrylate), 53.62% by weight of SR489 (tridecyl acrylate), 19.50% by weight of M600 (dipentaerythritol hexaacrylate), and 2.50% by weight of a polymerizable photoinitiator INI-C1 (Table 18 in [0315] of Japanese Unexamined Patent Application Publication (Translation of PCT application) No. 2011-500932).

SUMMARY

However, any one of the compositions and inks disclosed in Japanese Patent Nos. 3461501 and 3544658, Japanese Unexamined Patent Application Publication Nos. 2009-62541 and 2008-179136, and Japanese Unexamined Patent Application Publication (Translation of PCT application) No. 2008-507598 has room for improvement in curability. Accordingly, an advantage of some aspects of the invention is that it provides a photocurable ink composition for ink jet recording which has excellent curability.

In addition, the compositions and inks disclosed in Japanese Patent No. 4204333, Japanese Unexamined Patent Application Publication Nos. 2010-157706 and 2009-96910, and Japanese Unexamined Patent Application Publication (Translation of PCT application) No. 2011-500932 are poor in curability and extensibility of cured films, and cause the problem of producing wrinkles (hereinafter referred to as "curing wrinkles") in surfaces of cured films, particularly when ink thick coating films of about 10 μm in thickness are cured. In addition, the free radical curable solution (INV-18) disclosed in Japanese Unexamined Patent Application Publication (Translation of PCT application) No. 2011-500932 does not contain a colorant. A free radical curable solution and ink composition each containing a colorant are inferior in curability to a free radical curable solution and ink composition not each containing a colorant, and tend to be degraded in inner curability of thick films, particularly, when thick-film recording is performed. Therefore, a photocurable ink composition for ink jet recording which contains a colorant and has excellent curability is required. Accordingly, an advantage of some aspects of the invention is that it provides a photocurable ink composition for ink jet recording which is excellent in thick-film curability and extensibility of cured films when thick films are cured, and which is capable of preventing the occurrence of curing wrinkles when thick films are cured.

The inventors conducted intensive research for resolving the above-described problems. First, a cause for room of improvement in curability of the composition or ink disclosed in each of the patent documents was examined. Any one of the compositions and inks contains 2-(vinyloxyethoxy)ethyl (meth)acrylate as a polymerizable compound. It was found that 2-(vinyloxyethoxy)ethyl (meth)acrylate has the function of improving curability, but an ink containing only 2-(vinyloxyethoxy)ethyl (meth)acrylate as a polymerizable compound cannot be said to have sufficient curability. In other words, it was found that an ink containing 2-(vinyloxyethoxy)ethyl (meth)acrylate in combination with another compound as polymerizable compounds may be excellent in curability.

Therefore, the inventors examined such another compound. First, it was found that each of the ink composition and the reactive diluent composition disclosed in Japanese Patent Nos. 3461501 and 3544658 is characterized by containing a compound having only a vinyl ether group and a compound having only a (meth)acrylate group, but these compositions are poor in curability.

In addition, a bifunctional vinyl ether monomer (compound having only a vinyl ether group as a substituent) disclosed in Japanese Unexamined Patent Application Publication No. 2009-62541 is considered as the other compound. However, the compound having only a vinyl ether group as a substituent decreases a curing rate. Therefore, it was found that the bifunctional vinyl ether monomer is unsuitable as the other compound.

In addition, isobornyl acrylate disclosed in Japanese Unexamined Patent Application Publication No. 2008-179136 is considered as the other compound. However, isobornyl acrylate also decreases a curing rate. Therefore, it was found that isobornyl acrylate is unsuitable as the other compound.

In addition, alkoxylated phenoxyethyl acrylate disclosed in Japanese Unexamined Patent Application Publication (Translation of PCT application) No. 2008-507598 is considered as the other compound. However, alkoxylated phenoxyethyl acrylate has the property of relatively high viscosity and relatively low solubility, and thus the radiation curable ink jet ink containing alkoxylated phenoxyethyl acrylate cannot be said to have a sufficiently high curing rate. Therefore, it was found that alkoxylated phenoxyethyl acrylate is unsuitable as the other compound.

On the basis of these findings, the inventors repeated further intensive research. As a result, it was found that the above-described problems can be resolved by a photocurable ink composition for ink jet recording which contains polymerizable compounds including a vinyl ether group-containing (meth)acrylate with a predetermined structure and phenoxyethyl (meth)acrylate, and a photopolymerization initiator, leading to the achievement of the present invention.

As a result of further intensive research for solving the problems, the inventors found that the above-described problem can be resolved by a photocurable ink composition for ink jet recording which contains a colorant and, as polymerizable compounds, predetermined amounts of a vinyl ether group-containing (meth)acrylate with a predetermined structure, a monofunctional (meth)acrylate other than the vinyl ether group-containing (meth)acrylate, and a bi- or higher-functional (meth)acrylate, leading to the achievement of the present invention.

According to an embodiment, the present invention provides the following:

[1] A photocurable ink composition for ink jet recording which contains polymerizable compounds, a photopolymerization initiator, and a colorant, wherein the polymerizable compounds include a vinyl ether group-containing (meth) acrylate represented by general formula (I) below:

$$CH_2=CR^1-COOR^2-O-CH=CH-R^3 \qquad (I)$$

(wherein $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms) and phenoxyethyl (meth)acrylate.

[2] The photocurable ink composition for ink jet recording described in [1], wherein the content of the phenoxyethyl (meth)acrylate is 9 to 60% by mass relative to the total mass of the ink composition.

[3] The photocurable ink composition for ink jet recording described in [1] or [2], wherein the photopolymerization initiator contains 7% by mass or more of an acylphosphine oxide compound relative to the total mass of the ink composition.

[4] The photocurable ink composition for ink jet recording described in [1] or [2], wherein the photopolymerization initiator contains 7 to 15% by mass of an acylphosphine oxide compound relative to the total mass of the ink composition.

[5] The photocurable ink composition for ink jet recording described in [1] or [2], wherein the photopolymerization initiator contains 10 to 15% by mass of an acylphosphine oxide compound relative to the total mass of the ink composition.

[6] The photocurable ink composition for ink jet recording described in any one of [1] to [5], wherein the vinyl ether group-containing (meth)acrylate is 2-(vinyloxyethoxy)ethyl (meth)acrylate.

[7] The photocurable ink composition for ink jet recording described in any one of [1] to [6], wherein the content of the vinyl ether group-containing (meth)acrylate is 10 to 60% by mass relative to the total mass of the ink composition.

[8] The photocurable ink composition for ink jet recording described in any one of [1] to [7], wherein the ink composition is cured by irradiation with ultraviolet light having an emission peak wavelength in a range of 350 to 420 nm and an irradiation energy of 300 mJ/cm² or less.

[9] An ink jet recording method including an ejection step of ejecting the photocurable ink composition for ink jet recording described in any one of [1] to [8] onto a recording medium, and a curing step of curing the photocurable ink composition for ink jet recording by ultraviolet irradiation of the photocurable ink composition for ink jet recording ejected in the ejection step.

According to a second embodiment, the present invention provides the following:

[1] A photocurable ink composition for ink jet recording which contains polymerizable compounds, a photopolymerization initiator, and a colorant, wherein the polymerizable compounds include, relative to the total mass of the ink composition, 10 to 40% by mass of a vinyl ether group-containing (meth)acrylate represented by general formula (I) below:

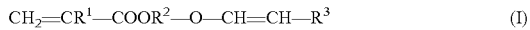
$$CH_2=CR^1-COOR^2-O-CH=CH-R^3 \qquad (I)$$

(wherein R¹ is a hydrogen atom or a methyl group, R² is a divalent organic residue having 2 to 20 carbon atoms, and R³ is a hydrogen atom or a monovalent organic residue having 1 to 11 carbon atoms), 20 to 60% by mass of a monofunctional (meth)acrylate (excluding the vinyl ether group-containing (meth)acrylate), and 10 to 40% by mass of a polyfunctional (meth)acrylate.

[2] The photocurable ink composition for ink jet recording described in [1], wherein the monofunctional (meth)acrylate contains 10 to 60% by mass of phenoxyethyl (meth)acrylate relative to the total mass of the ink composition.

[3] The photocurable ink composition for ink jet recording described in [1] or [2], wherein the photopolymerization initiator contains 6 to 13% by mass of an acylphosphine oxide compound relative to the total mass of the ink composition.

[4] The photocurable ink composition for ink jet recording described in any one of [1] to [3], wherein the content of the monofunctional (meth)acrylate is 20 to 40% by mass relative to the total mass of the ink composition.

[5] The photocurable ink composition for ink jet recording described in any one of [1] to [4], wherein the content of the polyfunctional (meth)acrylate is 20 to 30% by mass relative to the total mass of the ink composition.

[6] The photocurable ink composition for ink jet recording described in any one of [1] to [5], wherein the ink composition can be cured by irradiation with ultraviolet light having an emission peak wavelength in a range of 350 to 420 nm and an irradiation energy of 300 mJ/cm² or less.

[7] The photocurable ink composition for ink jet recording described in any one of [1] to [6], wherein the vinyl ether group-containing (meth)acrylate is 2-(vinyloxyethoxy)ethyl (meth)acrylate.

[8] The photocurable ink composition for ink jet recording described in any one of [1] to [7], wherein the primary skin irritation index of the monofunctional (meth)acrylate is 0 to 4.

[9] An ink jet recording method using the photocurable ink composition for ink jet recording described in any one of [1] to [8], the method including causing the photocurable ink composition for ink jet recording to adhere to a recording medium; and irradiating, using a light-emitting diode, the adhering photocurable ink composition for ink jet recording with ultraviolet light having an emission peak wavelength in a range of 350 to 420 nm.

[10] The ink jet recording method described in [9], wherein the irradiation energy of the ultraviolet light is 300 mJ/cm² or less.

DESCRIPTION OF EXEMPLARY EMBODIMENTS

A first embodiment of the present invention is described in detail below. The present invention is not limited to this embodiment and can be carried out with various changes within the scope of the gist of the invention.

In the specification, the term "curing" represents that an ink containing a polymerizable compound is solidified by polymerization of the polymerizable compound when the ink is irradiated with light. The term "curability" refers to the property of being cured in response to light. The term "adhesion" refers to the property that a coated film is little separated from a base. The term "abrasion resistance" refers to the property that a cured product is little separated from a recording medium by scratching.

In the specification, the term "(meth)acrylate" represents at least one of acrylate and corresponding methacrylate, and the term "(meth)acryl" represents at least one of acryl and corresponding methacryl.

In the specification, a "recorded material" represents a material on which a cured product is formed by recording an ink on a recording medium. In the specification, the cured product represents a cured material including an ink cured film or coating film.

[Photocurable Ink Composition for Ink Jet Recording]

A photocurable ink composition for ink jet recording (simply referred to as an "ink composition" hereinafter) according to an embodiment of the present invention contains polymerizable compounds, a photopolymerization initiator, and a colorant. The polymerizable compounds include a vinyl ether group-containing (meth)acrylate represented by general formula (I):

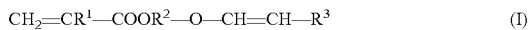

$$CH_2=CR^1-COOR^2-O-CH=CH-R^3 \quad (I)$$

(wherein R¹ is a hydrogen atom or a methyl group, R² is a divalent organic residue having 2 to 20 carbon atoms, and R³ is a hydrogen atom or a monovalent organic residue having 1 to 11 carbon atoms) and phenoxyethyl (meth)acrylate.

Hereinafter, additives (components) which are contained or can be contained in the ink composition according to the embodiment are described.

[Polymerizable Compound]

The polymerizable compounds contained in the ink composition according to the embodiment are capable of curing an printed ink by polymerization caused by the action of the photopolymerization initiator described below during ultraviolet irradiation.

(Vinyl Ether Group-Containing (Meth)Acrylate)

The vinyl ether group-containing (meth)acrylate contained as an essential polymerizable compound in the embodiment is represented by the general formula (I).

The ink composition contains the vinyl ether group-containing (meth)acrylate in combination with the phenoxyethyl (meth)acrylate described below. Therefore, the ink can be decreased in viscosity, and any one of curability, abrasion resistance, adhesion, and solubility of the photopolymerization initiator can be improved. The cause for the excellent solubility of the photopolymerization initiator is improved compatibility between the polymerizable compounds and the additives such as the photopolymerization initiator.

Furthermore, when a compound containing both a vinyl ether group and a (meth)acrylate group in its molecule is used, ink curability is desirably more improved as compared with when a vinyl ether group-containing compound and a compound containing a (meth)acrylate group (one of radical polymerizable groups) are separated used.

In the general formula (I), a divalent organic residue represented by R² and having 2 to 20 carbon atoms is preferably a linear, branched, or cyclic alkylene group which has 2 to 20 carbon atoms and may be substituted, an alkylene group which has 2 to 20 carbon atoms and an oxygen atom through an ether bond and/or an ester bond in its structure and which may be substituted, or a divalent aromatic group which has 6 to 11 carbon atoms and may be substituted. Preferred specific examples of these groups include alkylene groups having 2 to 6 carbon atoms, such as an ethylene group, a n-propylene group, an isopropylene group, a butylene group, and the like; and alkylene groups having 2 to 9 carbon atoms and an oxygen atom through an ether bond in its structure, such as an oxyethylene group, an oxy-n-propylene group, an oxyisopropylene group, and an oxybutylene group, and the like.

In the general formula (I), a monovalent organic residue represented by R³ and having 1 to 11 carbon atoms is preferably a linear, branched, or cyclic alkyl group which has 1 to 10 carbon atoms and may be substituted, or an aromatic group which has 6 to 11 carbon atoms and may be substituted.

Preferred examples of these groups include alkyl groups having 1 to 2 carbon atoms, such as a methyl group and an ethyl group, and aromatic groups having 6 to 8 carbon atoms, such as a phenyl group and a benzyl group.

When each of the organic residues is a group which may be substituted, substituents are divided into groups containing a carbon atom and groups not containing a carbon atom. When the substituent is a group containing a carbon atom, the carbon atom is counted in the number of carbon atoms of the organic residue. Examples of the group containing a carbon atom include, but are not limited to, a carboxyl group and an alkoxy group. Examples of the group not containing a carbon atom include, but are not limited to, a hydroxyl group and a halo-group.

Examples of the vinyl ether group-containing (meth)acrylate include, but are not limited to, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, polyethylene glycol monovinyl ether (meth)acrylate, and polypropylene glycol monovinyl ether (meth)acrylate.

Among these, 2-(vinyloxyethoxy)ethyl (meth)acrylate, i.e., at least one of 2-(vinyloxyethoxy)ethyl acrylate and 2-(vinyloxyethoxy)ethyl methacrylate, is preferred, and 2-(vinyloxyethoxy)ethyl acrylate is more preferred because when it is used in combination with the phenoxyethyl (meth)acrylate described below, the ink can be decreased in viscosity and has a high flashing point and more excellent curability. In particular, any one of 2-(vinyloxyethoxy)ethyl acrylate and 2-(vinyloxyethoxy)ethyl methacrylate has a simple structure and a low molecular weight, and thus the viscosity of the ink can be further decreased. Examples of 2-(vinyloxyethoxy)ethyl (meth)acrylate include 2-(2-vinyloxyethoxy)ethyl (meth)acrylate and 2-(1-vinyloxyethoxy)ethyl (meth)acrylate. Examples of 2-(vinyloxyethoxy)ethyl acrylate include 2-(2-vinyloxyethoxy)ethyl acrylate and 2-(1-vinyloxyethoxy)ethyl acrylate. In addition, 2-(vinyloxyethoxy)ethyl acrylate is superior in curability to 2-(vinyloxyethoxy)ethyl methacrylate.

These vinyl ether group-containing (meth)acrylates may be used alone or in combination of tow or more.

The content of the vinyl ether group-containing (meth)acrylate is preferably 10 to 60% by mass relative to the total mass (100% by mass) of the ink composition in order to further improve curability, and more preferably 10 to 30% by mass and still more preferably 20 to 30% by mass in order to further improve abrasion resistance and adhesion in addition to curability. On the other hand, in order that the ink composition has particularly excellent curability, the content is more preferably 20 to 60% by mass and still more preferably 30 to 60% by mass.

Examples of a method for producing the vinyl ether group-containing (meth)acrylate include, but are not limited to, a method (method B) of esterifying (meth)acrylic acid with hydroxyl group-containing vinyl ether, a method (method C) of esterifying (meth)acrylic acid halide with hydroxyl group-containing vinyl ether, a method (method D) of esterifying (meth)acrylic anhydride with hydroxyl group-containing vinyl ether, a method (method E) of ester-exchanging (meth)acrylate with hydroxyl group-containing vinyl ether, a method (method F) of esterifying (meth)acrylic acid with halogen-containing vinyl ether, a method (method G) of esterifying (meth)acrylic acid alkali (earth) metal salt with halogen-containing vinyl ether, a method (method H) of vinyl-exchanging hydroxyl group-containing (meth)acrylate with vinyl carboxylate, and a method (method I) of ether-exchanging hydroxyl group-containing (meth)acrylate with alkyl vinyl ether.

Among these, the method E is preferred because a desired effect can be more exhibited in the embodiment.

(Phenoxyethyl (Meth)Acrylate)

The ink composition according to the embodiment contains the phenoxyethyl (meth)acrylate as the polymerizable compound. Since the ink composition according to the embodiment contains the phenoxyethyl (meth)acrylate as the polymerizable compound in addition to the vinyl ether group-containing (meth)acrylate, the ink can be decreased in viscosity, and all of curability, abrasion resistance, adhesion, and photopolymerization initiator solubility can be improved.

In order to further improve curability, the content of the phenoxyethyl (meth)acrylate is preferably 9 to 60% by mass, more preferably 10 to 50% by mass, and still more preferably 10 to 40% by mass relative to the total mass (100% by mass) of the ink composition. When the content is not less than the lower limit value (particularly 10% by mass), the solubility of the photopolymerization initiator, in addition to curability, can be further improved. On the other hand, when the content is not more than the upper limit value (particularly 50% by mass), adhesion, in addition to curability, can be further improved.

(Monofunctional (Meth)Acrylate)

The ink composition according to the embodiment may further contain the monofunctional (meth)acrylate (excluding the phenoxyethyl (meth)acrylate) as the polymerizable compound. Examples thereof include, but are not limited to, isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 4-hydroxybutyl (meth)acrylate, butoxyethyl (meth)acrylate, ethoxy diethylene glycol (meth)acrylate, methoxy diethylene glycol (meth)acrylate, methoxy polyethylene glycol (meth) acrylate, methoxy propylene glycol (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, tert-butylcyclohexyl (meth)acrylate, dicyclopentanyl (meth)acrylate, dicyclopentenyloxyethyl (meth)acrylate, benzyl (meth)acrylate, ethoxylated nonylphenyl (meth)acrylate, alkoxylated nonylphenyl (meth) acrylate, and p-cumylphenol EO (ethylene oxide)-modified (meth)acrylate.

These monofunctional (meth)acrylates may be used alone or in combination of two or more.

The ink composition preferably contains the monofunctional (meth)acrylate within a range in which the desired effect of the embodiment is not impaired. The content of the monofunctional (meth)acrylate is preferably 50% by mass or less relative to the total mass (100% by mass) of the ink composition.

(Polyfunctional (Meth)Acrylate)

The ink composition according to the embodiment may further contain the polyfunctional (meth)acrylate as the polymerizable compound. Examples of a bifunctional (meth) acrylate (excluding the predetermined vinyl ether group-containing (meth)acrylate as the polyfunctional (meth)acrylate include, but are not limited to, triethylene glycol di(meth) acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-dutanediol di(meth)acrylate, 1,6-hexanediol di(meth)acrylate, 1,9-nonanediol di(meth) acrylate, neopentyl glycol di(meth)acrylate, dimethyloltricyclodecane di(meth)acrylate, bisphenol A EO (ethylene oxide) adduct di(meth)acrylate, bisphenol A PO (propylene oxide) adduct di(meth)acrylate, neopentyl glycol hydroxypivalate di(meth)acrylate, and polytetramethylene glycol di(meth) acrylate. Among these, at least one of dipropylene glycol diacrylate and tripropylene glycol diacrylate is preferred because of high curability and easy decrease in viscosity of the ink.

Examples of a tri- or higher-functional (meth)acrylate as the polyfunctional (meth)acrylate include, but are not limited to, trimethylolpropane tri(meth)acrylate, EO-modified trimethylolpropane tri(meth)acrylate, pentaerythritol tri(meth) acrylate, pentaerythritol tetra(meth)acrylate, dipentaerythritol hexa(meth)acrylate, ditrimethylolpropane tetra(meth) acrylate, glyceryl propoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

These polyfunctional (meth)acrylates may be used alone or in combination of two or more.

The ink composition preferably contains the polyfunctional (meth)acrylate within a range in which the desired effect of the embodiment is not impaired. The content of the polyfunctional (meth)acrylate is preferably 40% by mass or less relative to the total mass (100% by mass) of the ink composition. When the content of the polyfunctional (meth) acrylate falls in the above-described range, an increase in viscosity of the ink can be prevented, and good flexibility of a recorded material can be secured.

(Polymerizable Compound Other than the Above)

Besides the vinyl ether group-containing (meth)acrylate, the monofunctional (meth)acrylate, and the polyfunctional (meth)acrylate, any one of various known monofunctional and polyfunctional monomers and oligomers can be further used (hereinafter, referred to as the "other polymerizable compound"). Examples of the monomers include unsaturated carboxylic acids such as itaconic acid, crotonic acid, isocrotonic acid, maleic acid, and the like, salts or esters thereof, urethane, amides and anhydrides thereof, acrylonitrile, styrene, various unsaturated polyesters, unsaturated polyethers, unsaturated polyamides, and unsaturated urethanes. Examples of the oligomers include oligomers composed of the monomers.

These other polymerizable compounds may be used alone or in combination of two or more.

The ink composition preferably contains the other polymerizable compound within a range in which the desired effect of the embodiment is not impaired. The content of the other polymerizable compound is preferably 10% by mass or less relative to the total mass (100% by mass) of the ink composition.

[Photopolymerization Initiator]

The photopolymerization initiator contained in the ink composition according to the embodiment is used for curing an ink present on a surface of a recording medium by photopolymerization under ultraviolet irradiation to form a print. Among radiations, the use of ultraviolet rays (UV) exhibits excellent safety and can suppress the cost of a light source lamp. The photopolymerization initiator is not limited as long as active species such as radical or cation are produced by light (ultraviolet ray) energy to initiate polymerization of the polymerizable compounds. However, a photo-radical polymerization initiator and a photo-cationic polymerization initiator can be used, and particularly, the photo-radical polymerization initiator is preferably used.

Examples of the photo-radical polymerization initiator include aromatic ketones, acylphosphine oxide compounds, aromatic onium salt compounds, organic peroxides, thio compounds (thioxanthone compounds, thiophenyl group-containing compounds, and the like), hexaaryl biimidazole compounds, ketoxime ester compounds, borate compounds, azinium compounds, metallocene compounds, active ester compounds, compounds having carbon-halogen bonds, and alkylamine compounds.

Among these, at least one of the acylphosphine oxide compounds and the thioxanthone compounds is preferably used, the acylphosphine oxide compounds are more preferably used, and the acylphosphine oxide compounds are still more preferably used in combination with the thioxanthone compounds, particularly, because the curability of an ink can be further improved.

Examples of the photo-radical polymerization initiator include acetophenone, acetophenone benzyl ketal, 1-hydroxycyclohexyl phenyl ketone, 2,2-dimethoxy-2-phenyl acetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, bis(2,4,6-trimethylbenzoyl)-phenylphosphine oxide, 2,4,6-trimethylbenzoyl-diphenylphosphine oxide, 2,4-diethylthioxanthone, and bis-(2,6-dimethoxybenzoyl)-2,4,4-trimethylpentyl phosphine oxide.

Examples of commercial products of the photo-radical polymerization initiator include IRGACURE 651 (2,2-dimethoxy-1,2-diphenylethan-1-one), IRGACURE 184 (1-hydroxy-cyclohexyl-phenyl-ketone), DAROCUR 1173

(2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl}-2-methyl-propan-1-one}, IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl)phenyl]-1-butanone), DAROCUR TPO (2,4,6-trimethylbenzoyl-diphenyl-phosphine oxide), IRGACURE 819 (bis(2,4,6-trimethylbenzoyl)-phenylphosphine oxide), IRGACURE 784 (bis(η5-2,4-cyclopentadien-1-yl)-bis(2,6-difluoro-3-(1H-pyrrol-1-yl)-phenyl)titanium), IRGACURE OXE 01 (1.2-octanedione, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), and IRGACURE 754 (mixture of oxyphenylacetic acid, 2-[2-oxo-2-phenylacetoxyethoxy]ethyl ester and oxyphenylacetic acid, and 2-(2-hydroxyethoxy)ethyl ester) (trade names, manufactured by BASF Corporation), KAYACURE DETX-S (2,4-diethylthioxanthone) (trade name, manufactured by Nippon Kayaku Co., Ltd.), Speedcure TPO (2,4,6-trimethyl-benzoyldiphenyl-phosphine oxide) and Speedcure DETX (2,4-diethylthioxanthen-9-one) (trade name, manufactured by Lambson Ltd.), Lucirin TPO, LR8893, and LR8970 (trade names, manufactured by BASF Corporation), and UBECRYL P36 (trade name, manufactured by UCB Corporation).

These photopolymerization initiators may be used alone or in combination of two or more.

The content of the photopolymerization initiator is preferably 8 to 20% by mass relative to the total mass (100% by mass) of the ink composition in order to achieve the excellent curability by improving the ultraviolet curing rate and to avoid coloring due to the photopolymerization initiator and the photopolymerization initiator from remaining undissolved.

In particular, when the photopolymerization initiator contains an acylphosphine oxide compound, the content of the acylphosphine oxide compound is preferably 7% by mass or more, more preferably 7 to 15% by mass, particularly preferably 10 to 15% by mass, and still more preferably 10 to 14% by mass, relative to the total mass (100% by mass) of the ink composition. When the content is not less than the lower limit (particularly, 10% by mass), the curability is more excellent. More specifically, the curability is more excellent because a satisfactory curing rate can be achieved by curing with LED (preferably, emission peak wavelength: 350 nm to 420 nm}. On the other hand, when the content is not more than the upper limit (particularly, 14% by mass), the solubility of the photopolymerization initiator is more excellent.

In addition, when the content of the acylphosphine oxide compound falls in the above-described range, the acylphosphine oxide compound may preferably contain 4% by mass or more, more preferably 6% by mass or more, of a bisacylphosphine oxide compound relative to the total mass (100% by mass) of the ink composition. When the content of the bisacylphosphine oxide compound is not less than the lower limit (particularly, 6% by mass), the curability is more excellent. Further, the upper limit of the content of the bisacylphosphine oxide compound is preferably 10% by mass or less, more preferably 8% by mass or less, relative to the total mass (100% by mass) of the ink composition because of the more excellent solubility of the initiator.

In addition, when the content of the acylphosphine oxide compound falls in the above-described range, the acylphosphine oxide compound may preferably contain 53% by mass or more, more preferably 55% by mass or more, of a bisacylphosphine oxide compound relative to the total mass (100% by mass) of the acylphosphine oxide compound. When the content of the bisacylphosphine oxide compound is not less than the lower limit (particularly, 55% by mass), the curability is more excellent. Further, the upper limit of the content of the bisacylphosphine oxide compound is preferably 90% by mass or less, more preferably 80% by mass or less, relative to the total mass (100% by mass) of the acylphosphine oxide compound because the more excellent solubility of the initiator.

Examples of the bisacylphosphine oxide compound include, but are not limited to, bis(2,4,6-trimethylbenzoyl)-phenylphosphine oxide and bis(2,6-dimethoxybenzoyl)-2,4,4-trimethylpentylphosphine oxide. Examples of the acrylphosphine oxide compound other than the bisacylphosphine oxide compound include, but are not limited to, monoacylphosphine oxide compounds. Examples of the monoacylphosphine oxide compounds include, but are not limited to, 2,4,6-trimethylbenzoyl-diphenyl-phosphine oxide.

Further, when the content of the phenoxyethyl (meth)acrylate falls in the above-described preferred range, the solubility of the acylphosphine oxide compound is further improved, and thus the content of the acylphosphine oxide compound can be adjusted in the above-described preferred range. Therefore, a correlation is established between the contents of the phenoxyethyl (meth)acrylate and the acylphosphine oxide compound.

When the photopolymerization initiator contains a thioxanthone compound, the content thereof is preferably 1 to 5% by mass relative to the total mass (100% by mass) of the ink composition.

[Colorant]

The ink composition according to the embodiment further contains the colorant. As the colorant, at least one of a pigment and a dye can be used, and a pigment is preferred in view of excellent light resistance.

(Pigment)

In the embodiment, the light resistance of the ink composition can be improved by using a pigment as the colorant. As the pigment, either an inorganic pigment or an organic pigment can be used.

Usable examples of the inorganic pigment include carbon black (C. I. Pigment Black 7) such as furnace black, lamp black, acetylene black, channel black, and the like, iron oxide, and titanium oxide.

Usable examples of the organic pigment include azo pigments such as insoluble azo pigments, condensed azo pigments, azo-lakes, chelate azo pigments, and the like; polycyclic pigments such as phthalocyanine pigments, perylene and perynone pigments, anthraquinone pigments, quinacridone pigments, dioxane pigments, thioindigo pigments, isoindolinone pigments, quinophthalone pigments, and the like; dye chelates (e.g., basic dye-type chelates, acid dye-type chelates, and the like), dye lakes (basic dye-type lakes and acid dye-type lakes), nitro pigments, nitroso pigments, aniline black, and daylight fluorescent pigments.

In further detail, examples of carbon black used as a black ink include No. 2300, No. 900, MCF88, No. 33, No. 40, No. 45, No. 52, MA7, MA8, MA100, No. 2200B, and the like (trade names, manufactured by Mitsubishi Chemical Corporation), Raven 5750, Raven 5250, Raven 5000, Raven 3500, Raven 1255, Raven 700, and the like (trade names, manufactured by Carbon Columbia Corporation), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (trade names, manufactured by CABOT JAPAN K.K.), and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, and the like (trade names, manufactured by Degussa Corporation).

Examples of a pigment used as a white ink include C. I. Pigment White 6, 18, and 21.

Examples of a pigment used as a yellow ink include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of a pigment used as a magenta ink include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C. I. Pigment Violet 19, 23, 32, 33, 36, 38, 43, and 50.

Examples of a pigment used as a cyan ink include C. I. Pigment Blue 1, 2, 3, 15, 15:1, 15:2, 15:3, 15:34, 15:4, 16, 18, 22, 25, 60, 65, and 66, and C. I. Vat Blue 4 and 60.

Examples of pigments other than magenta, cyan, yellow include C. I. Pigment Green 7 and 10, C. I. Pigment Brown 3, 5, 25, and 26, C. I. Pigment Orange 1, 2, 5, 7, 13, 14, 15, 16, 24, 34, 36, 38, 40, 43, and 63.

These pigments may be used alone or in combination of two or more.

(Dye)

In the embodiment, a dye can be used as the colorant. The dye is not particularly limited, and an acid dye, a direct dye, a reactive dye, and a basic dye can be used. Examples of the dye include C. I. Acid Yellow 17, 23, 42, 44, 79, and 142, C. I. Acid Red 52, 80, 82, 249, 254, and 289, C. I. Acid Blue 9, 45, and 249, C. I. Acid Black 1, 2, 24, and 94, C. I. Food Black 1 and 2, C. I. Direct Yellow 1, 12, 24, 33, 50, 55, 58, 86, 132, 142, 144, and 173, C. I. Direct Red 1, 4, 9, 80, 81, 225, and 227, C. I. Direct Blue 1, 2, 15, 71, 86, 87, 98, 165, 199, and 202, C. I. Direct Black 19, 38, 51, 71, 154, 168, 171, and 195, C. I. Reactive Red 14, 32, 55, 79, and 249, and C. I. Reactive Black 3, 4, and 35.

These dyes may be used alone or in combination of two or more.

The content of the colorant is preferably 1 to 20% by mass relative to the total mass (100% by mass) of the ink composition because good coloring properties can be exhibited, and the inhibition of curing of a coating film due to light absorption by the colorant can be decreased. A photocurable ink composition containing a colorant is inferior to an ink composition not containing a colorant in curability and adhesion and abrasion resistance of a recorded material. However, the photocurable ink composition according to the embodiment has excellent curability, adhesion, and abrasion resistance and can be used for image recording.

[Dispersant]

When the ink composition according to the embodiment contains a pigment, the ink composition may further contain a dispersant for improving pigment dispersibility. Examples of the dispersant include, but are not limited to, dispersants such as polymeric dispersants commonly used for preparing pigment dispersion solutions. Specific examples of the polymeric dispersants include those each containing, as a main component, at least one of polyoxyalkylene polyalkylene polyamines, vinyl polymers and copolymers, acryl polymers and copolymers, polyesters, polyamides, polyimides, polyurethanes, amino polymers, silicon-containing polymers, sulfur-containing polymers, fluorine-containing polymers, and epoxy resins. Commercial products of the polymeric dispersants include Ajisper Series (trade name) manufactured by Ajinomoto Fine-Techno Co., Inc., Solsperse Series (Solsperse 32000, 36000, etc. (trade name)) available from Avecia Co., Disperbyk Series (trade name) manufactured by BYK Chemie Co., Ltd., and Disparlon Series (trade name) manufactured by Kusumoto Chemical Ltd.

These dispersants may be used alone or in combination of two or more. The content of the dispersant is not particularly limited, and the dispersant may be added in an appropriate desired amount.

[Polymerization Inhibitor]

The ink composition according to the embodiment may further contain a polymerization inhibitor. When the ink composition contains the polymerization inhibitor, polymerization reaction of the polymerizable compounds can be prevented before curing.

The polymerization inhibitor is not particularly limited, but, for example, a phenolic polymerization inhibitor can be used. Examples of the phenolic polymerization inhibitor include, but are not limited to, p-methoxyphenol, cresol, tert-butylcatechol, di-tert-butyl-para-cresol, hydroquinone monomethyl ether, α-naphthol, 3,5-di-tert-butyl-4-hydroxytoluene, 2,6-di-tert-butyl-4-methylphenol, 2,2'-methylene-bis(4-methyl-6-tert-butylphenol), 2,2'-methylene-bis(4-ethyl-6-butylphenol), and 4,4'-thio-bis(3-methyl-6-tert-butylphenol).

Examples of commercial products of the phenolic polymerization inhibitor include p-Methoxyphenol (trade name, manufactured by Tokyo Chemical Industry Co., Ltd., p-methoxyphenol), Nonflex MBP (trade name, manufactured by Seiko Chemical Co., Ltd., 2,2'-methylene-bis(4-methyl-6-tert-butylphenol)), and BHT Swanox (trade name, manufactured by Seiko Chemical Co., Ltd., 2,6-di-tert-butyl-4-methylphenol)).

These polymerization inhibitors may be used alone or in combination of two or more. The content of the polymerization inhibitor is not particularly limited, and the polymerization inhibitor may be added in an appropriate desired amount.

[Slipping Agent]

The ink composition according to the embodiment may further contain a slipping agent (surfactant). The slipping agent is not particularly limited, but, for example, a polyester-modified silicone or polyether-modified silicone can be used as a silicone surfactant, and particularly, polyether-modified polydimethylsiloxane or polyester-modified polydimethylsiloxane can be preferably used. Examples of commercial products of the slipping agent include BYK-347, BYK-348, and BYK-UV3500, 3510, 3530, and 3570 (above manufactured by BYK Co., Ltd.).

These slipping agents may be used alone or in combination of two or more. The content of the slipping agent is not particularly limited, and the slipping agent may be added in an appropriate desired amount.

[Other Additives]

The ink composition according to the embodiment may further contain additives (components) other than the above-described additives. These components are not particularly limited, but, for example, a generally known polymerization accelerator, permeation accelerator, and wetting agent (humectant), and other additives can be used. Examples of the other additives include a generally known fixing agent, fungicide, antiseptic, antioxidant, ultraviolet absorber, chelating agent, pH adjuster, and thickener.

[Characteristics of Photocurable Ink Composition for Ink Jet Recording]

The viscosity at 25° C. of the ink composition is preferably less than 35 mPa·s and more preferably 25 mPa·s or less in order to improve ejection stability of the ink and further improve curability of the ink.

In addition, the ink composition is preferably cured by irradiation with ultraviolet light having an emission peak wavelength within the range of 350 to 420 nm. When the ink composition of the embodiment can be cured at an emission peak wavelength within the above-described range, the ink composition can be rapidly cured with low energy due to the composition. In particular, the possibility of curing with low energy preferably leads to the possibility of using a light-emitting diode (LED), which has recently attracted attention from the environmental viewpoint, as an ultraviolet irradiation source. That is, the ink composition of the embodiment of the present invention is excellent in curability with LED.

In addition, the ink composition is preferably cured with an ultraviolet irradiation energy of 300 mJ/cm$^2$ or less, and more preferably 200 mJ/cm$^2$ or less. By using the ink composition, an image can be formed at low cost. The irradiation energy is calculated by multiplying the irradiation time by the irradiation intensity.

According to the embodiment, it is possible to provide the photocurable ink composition for ink jet recording which has excellent curability, low viscosity, excellent adhesion and abrasion resistance of an image (cured product), and excellent solubility of the photopolymerization initiator.

[Recording Medium]

The ink composition according to the embodiment of the present invention is ejected on a recording medium to form a recorded material by an ink jet recording method described below. As the recording medium, for example, an absorbent or non-absorbent recording medium can be used. The ink jet recording method according to an embodiment described below can be widely applied to recording media having various absorption performances, ranging from a non-absorbent recording medium which an aqueous ink hardly permeates to an absorbent recording medium which an aqueous ink easily permeates. However, when the ink composition is applied to the non-absorbent recording medium, a drying step may be required after curing by ultraviolet irradiation.

Examples of the absorbent recording medium include, but are not limited to, plain paper such as electrophotographic paper with high permeability to aqueous ink, ink jet paper (ink jet exclusive paper provided with an ink-absorbing layer composed of silica particles or alumina particles or an ink-absorbing layer composed of a hydrophilic polymer such as polyvinyl alcohol (PVA), polyvinylpyrrolidone (PVP), or the like), and art paper, coated paper, cast paper, and the like which have relatively low permeability to aqueous ink and are used for general offset printing.

Examples of the non-absorbent recording medium include, but are not limited to, plastic films, sheets, and plates of polyvinyl chloride (PVC), polyethylene, polypropylene, polyethylene terephthalate (PET), and the like; metal plates of iron, silver, copper, aluminum, and the like; metal plates and plastic films produced by vapor-depositing any one of the metals; alloy plates of stainless, brass, and the like.

[Ink Jet Recording Method]

An embodiment of the present invention relates to an ink jet recording method. The photocurable ink composition for ink jet recording according to the above-described embodiment of the present invention can be preferably used in the ink jet recording method according to the embodiment. The ink jet recording method of the embodiment includes an ejection step of ejecting the ink composition on a recording medium, and a curing step of curing the ink composition by ultraviolet irradiation of the ink composition ejected in the ejection step. Consequently, an image, i.e., a coating film (cured film), is formed from the ink composition cured on the recording medium. In addition, another embodiment of the present invention relates to the photocurable ink composition for ink jet recording according to the above-described embodiment of the present invention which is used in the ink jet recording method according to an embodiment of the present invention. The photocurable ink composition for ink jet recording according to the embodiment of the present invention which is used in the ink jet recording method according to an embodiment of the present invention represents the photocurable ink composition for ink jet recording according to the embodiment of the present invention which is sold for a recording apparatus for recording by the ink jet recording method according to an embodiment of the present invention.

[Ejection Step]

In the ejection step, the ink composition is ejected on the recording medium and adheres to the recording medium. The viscosity of the ink composition during ejection is preferably 3 to 20 mPa·s. When the viscosity of the ink composition is this value under a condition where the ink composition is at room temperature or is not heated, the ink composition may be ejected at room temperature or without heating. In this case, the ink temperature during ejection is preferably 20 to 30° C. On the other hand, the ink composition may be ejected with desired viscosity by heating to a predetermined temperature. In this way, good ejection stability can be realized.

The photocurable ink composition for ink jet recording of the embodiment of the present invention has higher viscosity than that of a usual aqueous ink composition and thus causes a large change in viscosity with a temperature change during ejection. Such a change in viscosity of the ink greatly influences a change in droplet size and a change in droplet ejection rate, resulting in deterioration in image quality. Therefore, the temperature of ink during ejection is preferably maintained as constant as possible.

[Curing Step]

In the next curing step, the ink composition ejected and adhering to the recording medium is cured by light (ultraviolet light) irradiation. This is because the photopolymerization initiator contained in the ink composition is decomposed by ultraviolet irradiation to produce initiation species such as radical, acid, and base, thereby accelerating polymerization reaction of the polymerizable compounds by the function of the initiation species. Alternatively, the polymerization reaction of the polymerizable compounds is initiated by ultraviolet irradiation. In this case, when a sensitizing dye is present together with the photopolymerization initiator in the ink composition, the sensitizing dye in the system comes into an excited state by absorbing ultraviolet light, and decomposition of the photopolymerization initiator is accelerated by contact with the photopolymerization initiator, so that high-sensitivity curing reaction can be achieved.

A mercury lamp, a gas/solid-state laser, and the like are mainly used as ultraviolet sources, and a mercury lamp and a metal halide lamp are widely known as light sources used for curing photocurable ink compositions for ink jet recording. On the other hand, at present, a mercury-free type is strongly demanded from the viewpoint of environmental protection, and the replacement by a GaN-based semiconductor ultraviolet light-emitting device is very useful from the industrial and environmental viewpoint. Further, a ultraviolet light-emitting diode (UV-LED) and an ultraviolet laser diode (UV-LD) have a small size, long life, high efficiency, and low cost, and are thus expected as light sources for photocurable ink jet. In particular, UV-LED is preferred.

In addition, the photocurable ink composition for ink jet recording which can be preferably cured with an irradiation energy of 300 mJ/cm² or less is preferably used in the ink jet recording method using a UV-LED preferably having an emission peak wavelength within the range of 350 to 420 nm because the output of LED can be easily increased. In this case, low-cost printing and a high printing speed can be realized. Such an ink composition can be produced by containing at least one of the photopolymerization initiator which is decomposed by irradiation with ultraviolet light within the above-described wavelength range and the polymerizable compound which is initiated to be polymerized by irradiation with ultraviolet light within the above-described wavelength range.

In addition, curing is preferably performed using a UV-LED with a peak irradiation intensity of 800 mW/cm² or more, and more preferably a peak intensity of 800 to 2000 mW/cm². In this case, curability of the ink composition can be further improved, and the appearance of a recorded material can also be improved.

According to the embodiment, it is possible to provide the preferred ink jet recording method using the photocurable ink composition for ink jet recording which has excellent curability, low viscosity, excellent adhesion and abrasion resistance of an image (cured product), and excellent solubility of the photopolymerization initiator.

A second embodiment of the present invention is described in detail below. The present invention is not limited to this embodiment described below and can be carried out with various changes within the scope of the gist of the invention.

In the specification, the term "curing" represents that an ink containing a polymerizable compound is solidified by polymerization of the polymerizable compound when the ink is irradiated with light. The term "curability" refers to the property of being cured in response to light. The term "extensibility", otherwise referred to as "elongation of an ink cured film (coating film)", refers to the property that a cured film is extended without cracking when a recorded material formed by curing an ink coating film is stretched.

In the specification, "(meth)acrylate" represents at least one of acrylate and corresponding methacrylate, "(meth)acryl" represents at least one of acryl and corresponding methacryl, and "(meth)acryloyl" represents at least one of acryloyl and corresponding methacryloyl.

In the specification, the term "recorded material" represents a material on which an ink is recorded to form a cured product by recording an ink on a recording medium. In the specification, the cured product represents a cured material including an ink cured film or coated film.

[Photocurable Ink Composition for Ink Jet Recording]

A photocurable ink composition for ink jet recording (simply referred to as an "ink composition" hereinafter) according to an embodiment of the present invention contains polymerizable compounds and a photopolymerization initiator. The polymerizable compounds include, relative to the total mass (100% by mass) of the ink composition, 10 to 40% by mass of a vinyl ether group-containing (meth)acrylate represented by the following general formula (I):

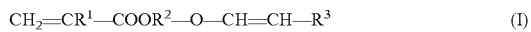   (I)

(wherein R¹ is a hydrogen atom or a methyl group, R² is a divalent organic residue having 2 to 20 carbon atoms, and R³ is a hydrogen atom or a monovalent organic residue having 1 to 11 carbon atoms), 20 to 60% by mass of a monofunctional (meth)acrylate (excluding the vinyl ether group-containing (meth)acrylate represented by the general formula (I)), and 10 to 40% by mass of a polyfunctional (meth)acrylate.

Hereinafter, additives (components) which are contained or can be contained in the ink composition according to the embodiment are described.

[Polymerizable Compound]

The polymerizable compounds contained in the ink composition according to the embodiment are capable of curing an printed ink by polymerization caused by the action of the photopolymerization initiator described below during ultraviolet irradiation.

(Vinyl Ether Group-Containing (Meth)Acrylate)

The vinyl ether group-containing (meth)acrylate contained as an essential polymerizable compound in the embodiment is represented by the general formula (I).

When the ink composition contains the vinyl ether group-containing (meth)acrylate, curability of an ink can be improved, and the viscosity of an ink can be further decreased. Furthermore, when a compound containing both a vinyl ether group and a (meth)acryl group in its molecule is used, ink curability is desirably more improved as compared with when a vinyl ether group-containing compound and a (meth)acryl group-containing compound are separately used.

In the general formula (I), a divalent organic residue represented by R² and having 2 to 20 carbon atoms is preferably a linear, branched, or cyclic alkylene group which has 2 to 20 carbon atoms and may be substituted, an alkylene group which has 2 to 20 carbon atoms, contains an oxygen atom through an ether bond and/or an ester bond in its structure, and which may be substituted, or a divalent aromatic group which has 6 to 11 carbon atoms and may be substituted. Preferred specific examples of these groups include alkylene groups having 2 to 6 carbon atoms, such as an ethylene group, a n-propylene group, an isopropylene group, a butylene group, and the like; and alkylene groups having 2 to 9 carbon atoms and an oxygen atom through an ether bond in its structure, such as an oxyethylene group, an oxy-n-propylene group, an oxyisopropylene group, and an oxybutylene group, and the like.

In the general formula (I), a monovalent organic residue represented by R³ and having 1 to 11 carbon atoms is preferably a linear, branched, or cyclic alkyl group which has 1 to 10 carbon atoms and may be substituted, or an aromatic group which has 6 to 11 carbon atoms and may be substituted. Preferred examples of these groups include alkyl groups having 1 to 2 carbon atoms, such as a methyl group and an ethyl group, and aromatic groups having 6 to 8 carbon atoms, such as a phenyl group and a benzyl group.

When each of the organic residues is a group which may be substituted, substituents are divided into groups containing a carbon atom and groups not containing a carbon atom. When a substituent is a group containing a carbon atom, the carbon atom is counted in the number of carbon atoms of the organic residue. Examples of the group containing a carbon atom include, but are not limited to, a carboxyl group and an alkoxy group. Examples of the group not containing a carbon atom include, but are not limited to, a hydroxyl group and a halo group.

Examples of the vinyl ether group-containing (meth)acrylate include, but are not limited to, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether (meth)acrylate, and polypropylene glycol monovinyl ether (meth)acrylate.

Among these, 2-(vinyloxyethoxy)ethyl (meth)acrylate, i.e., at least one of 2-(vinyloxyethoxy)ethyl acrylate and 2-(vinyloxyethoxy)ethyl methacrylate, is preferred, and 2-(vinyloxyethoxy)ethyl acrylate is more preferred because the ink can be decreased in viscosity and has a high flashing point and more excellent curability. In particular, any one of 2-(vinyloxyethoxy)ethyl acrylate and 2-(vinyloxyethoxy)ethyl methacrylate has a simple structure and a low molecular weight, and thus the viscosity of the ink can be further decreased. Examples of 2-(vinyloxyethoxy)ethyl (meth)acrylate include 2-(2-vinyloxyethoxy)ethyl (meth)acrylate and 2-(1-vinyloxyethoxy)ethyl (meth)acrylate. Examples of 2-(vinyloxyethoxy)ethyl acrylate include 2-(2-vinyloxyethoxy)ethyl acrylate and 2-(1-vinyloxyethoxy)ethyl acrylate. In addition, 2-(vinyloxyethoxy)ethyl acrylate is superior in curability to 2-(vinyloxyethoxy)ethyl methacrylate.

These vinyl ether group-containing (meth)acrylates may be used alone or in combination of tow or more.

The content of the vinyl ether group-containing (meth)acrylate is 10 to 40% by mass relative to the total mass (100% by mass) of the ink composition. When the content is 10% by mass or more, the curability of the ink is particularly excellent. On the other hand, when the content is 40% by mass or less, particularly, the occurrence of curing wrinkles can be prevented. In order to achieve more excellent curability of the ink and more effectively prevent the occurrence of curing wrinkles, the content is preferably 10 to 35% by mass, more preferably 10 to 30% by mass, still more preferably 20 to 30% by mass, relative to the total mass (100% by mass) of the ink composition.

Examples of a method for producing the vinyl ether group-containing (meth)acrylate include, but are not limited to, a method (method B) of esterifying (meth)acrylic acid with hydroxyl group-containing vinyl ether, a method (method C) of esterifying (meth)acrylic acid halide with hydroxyl group-containing vinyl ether, a method (method D) of esterifying (meth)acrylic anhydride with hydroxyl group-containing vinyl ether, a method (method E) of ester-exchanging (meth)acrylate with hydroxyl group-containing vinyl ether, a method (method F) of esterifying (meth)acrylic acid with halogen-containing vinyl ether, a method (method G) of esterifying (meth)acrylic acid alkali (earth) metal salt with halogen-containing vinyl ether, a method (method H) of vinyl-exchanging hydroxyl group-containing (meth)acrylate with vinyl carboxylate, and a method (method I) of ether-exchanging hydroxyl group-containing (meth)acrylate with alkyl vinyl ether.

Among these, the method E is preferred because a desired effect can be more exhibited in the embodiment.

(Monofunctional (Meth)Acrylate)

The ink composition according to the embodiment contains the monofunctional (meth)acrylate. Since the ink composition contains the monofunctional (meth)acrylate, particularly, particularly, the extensibility of a cured film can be improved. However, the vinyl ether group-containing (meth)acrylate represented by the general formula (I) is excluded from the monofunctional (meth)acrylate.

Examples thereof include, but are not limited to, isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 4-hydroxybutyl (meth)acrylate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone-modified flexible (meth)acrylate, tert-butylcyclohexyl (meth)acrylate, dicyclopentanyl (meth)acrylate, and dicyclopentenyloxyethyl (meth)acrylate.

Among these, phenoxyethyl (meth)acrylate is preferred, and phenoxyethyl acrylate is more preferred because compatibility with the additives such as the photopolymerization initiator can be improved, viscosity and odor can be decreased, and the curability of the ink can be further improved.

The primary skin irritation index (P. I. I.) of the monofunctional (meth)acrylate is preferably 0 to 4 and more preferably 0 to 3 because skin irritation can be suppressed, and ink safety can be improved.

These monofunctional (meth)acrylates may be used alone or in combination of two or more.

The content of the monofunctional (meth)acrylate is 20 to 60% by mass relative to the total mass (100% by mass) of the ink composition. When the content is 20% by mass or more, the extensibility of a cured film is excellent. On the other hand, when the content is 60% by mass or less, the occurrence of curing wrinkles can be prevented. In order to achieve more excellent extensibility of a cured film and more effectively prevent the occurrence of curing wrinkles, the content is preferably 25 to 55% by mass, and more preferably 30 to 50% by mass. In addition, particularly, in order to prevent the occurrence of curing wrinkles, the content is preferably 40% by mass or less and more preferably 20 to 40% by mass.

The content of phenoxyethyl (meth)acrylate among the monofunctional (meth)acrylates is preferably 10 to 60% by mass and more preferably 10 to 40% by mass relative to the total mass (100% by mass) of the ink composition. With a content within this range, the curability of the ink can be further improved. In addition, when an acylphosphine oxide compound is used as the photopolymerization initiator, the solubility thereof can be improved.

(Polyfunctional (Meth)Acrylate)

The ink composition according to the embodiment contains the polyfunctional (meth)acrylate. Since the ink composition contains the polyfunctional (meth)acrylate, particularly, the occurrence of curing wrinkles can be prevented. In the specification, the polyfunctional (meth)acrylate represents bi- or higher-functional (meth)acrylate.

Examples of the bifunctional (meth)acrylate as the polyfunctional (meth)acrylate include, but are not limited to, triethylene glycol di(meth)acrylate, tetraethylene glycol di(meth)acrylate, polyethylene glycol di(meth)acrylate, dipropylene glycol di(meth)acrylate, tripropylene glycol di(meth)acrylate, polypropylene glycol di(meth)acrylate, 1,4-dutanediol di(meth)acrylate, 1,6-hexanediol di(meth)acrylate, 1,9-nonanediol di(meth)acrylate, neopentyl glycol di(meth)acrylate, dimethyloltricyclodecane di(meth)acrylate, bisphenol A EO (ethylene oxide) adduct di(meth)acrylate, bisphenol A PO (propylene oxide) adduct di(meth)acrylate, neopentyl glycol hydroxypivalate di(meth)acrylate, and polytetramethylene glycol di(meth)acrylate. Among these, at least one selected from the group consisting of dipropylene glycol diacrylate, tripropylene glycol diacrylate, and dimethyloltricyclodecane diacrylate is preferred because of excellent safety and low skin irritation.

Examples of the tri- or higher-functional (meth)acrylate as the polyfunctional (meth)acrylate include, but are not limited to, trimethylolpropane tri(meth)acrylate, EO-modified trimethylolpropane tri(meth)acrylate, pentaerythritol tri(meth) acrylate, pentaerythritol tetra(meth)acrylate, dipentaerythritol hexa(meth)acrylate, ditrimethylolpropane tetra(meth) acrylate, glyceryl propoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate. Among these, dipentaerythritol hexaacrylate is preferred because of excellent safety and low skin irritation.

Besides the above, oligomers such as epoxy (meth)acrylate, urethane (meth)acrylates such as aliphatic urethane (meth)acrylate and aromatic urethane (meth)acrylate, polyester (meth)acrylate, and the like may be used as the polyfunctional (meth)acrylate. Among these, urethane acrylate oligomers are preferred because of excellent flexibility.

These polyfunctional (meth)acrylates may be used alone or in combination of two or more.

The content of the polyfunctional (meth)acrylate is 10 to 40% by mass relative to the total mass (100% by mass) of the ink composition. When the content is 10% by mass or more, the occurrence of curing wrinkles can be prevented. On the other hand, when the content is 40% by mass or less, the extensibility of a cured film is excellent. In order to more effectively prevent the occurrence of curing wrinkles and achieve more excellent extensibility of a cured film, the content is preferably 15 to 35% by mass and more preferably 20 to 30% by mass.

(Polymerizable Compound Other than the Above)

Besides the vinyl ether group-containing (meth)acrylate, the monofunctional (meth)acrylate, and the polyfunctional (meth)acrylate, any one of various known monofunctional and polyfunctional monomers and oligomers can be further used (hereinafter, referred to as the "other polymerizable compound"). Examples of the monomers include unsaturated carboxylic acids such as itaconic acid, crotonic acid, isocrotonic acid, maleic acid, and the like, salts or esters thereof, urethane, amides and anhydrides thereof, acrylonitrile, styrene, various unsaturated polyesters, unsaturated polyethers, unsaturated polyamides, and unsaturated urethane. Examples of the oligomers include oligomers formed from the monomers.

These other polymerizable compounds may be used alone or in combination of two or more. The content of the other polymerizable compound is preferably 50% by mass or less relative to the total mass (100% by mass) of the ink composition.

[Photopolymerization Initiator]

The photopolymerization initiator contained in the ink composition according to the embodiment is used for curing an ink present on a surface of a recording medium by photopolymerization under ultraviolet irradiation to form a print. Among radiations, the use of ultraviolet light (UV) exhibits excellent safety and can suppress the cost of a light source lamp. The photopolymerization initiator is not limited as long as active species such as radical or cation are produced by light (ultraviolet light) energy to initiate polymerization of the polymerizable compounds. However, a photo-radical polymerization initiator and a photo-cationic polymerization initiator can be used, and particularly, the photo-radical polymerization initiator is preferably used.

Examples of the photo-radical polymerization initiator include aromatic ketones, acylphosphine oxide compounds, aromatic onium salt compounds, organic peroxides, thio compounds (thioxanthone compounds, thiophenyl group-containing compounds, and the like), hexaaryl biimidazole compounds, ketoxime ester compounds, borate compounds, azinium compounds, metallocene compounds, active ester compounds, compounds having carbon-halogen bonds, and alkylamine compounds.

Among these, the acylphosphine oxide compounds are more preferably used, and the acylphosphine oxide compounds are still more preferably used in combination with the thioxanthone compounds particularly because the curability of an ink can be further improved.

Specific examples of the photo-radical polymerization initiator include acetophenone, acetophenone benzyl ketal, 1-hydroxycyclohexyl phenyl ketone, 2,2-dimethoxy-2-phenyl acetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, bis(2,4,6-trimethylbenzoyl)-phenylphosphine oxide, 2,4,6-trimethylbenzoyl-diphenyl-phosphine oxide, 2,4-diethylthioxanthone, and bis-(2,6-dimethoxybenzoyl)-2,4,4-trimethylpentyl phosphine oxide.

Examples of commercial products of the photo-radical polymerization initiator include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl]-2-methyl-propan-1-one}, IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl)phenyl]-1-butanone), DAROCUR TPO (2,4,6- trimethylbenzoyl-diphenyl-phosphine oxide), IRGACURE 819 (bis(2,4,6-trimethylbenzoyl)-phenylphosphine oxide), IRGACURE 784 (bis(η5-2,4-cyclopentadien-1-yl)-bis(2,6-difluoro-3-(1H-pyrrol-1-yl)-phenyl)titanium), IRGACURE OXE 01 (1.2-octanedione, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), and IRGACURE 754 (mixture of oxyphenylacetic acid, 2-[2-oxo-2-phenylacetoxyethoxy]ethyl ester and oxyphenylacetic acid, and 2-(2-hydroxyethoxy)ethyl ester) (manufactured by BASF Corporation), KAYACURE DETX-S (2,4-diethylthioxanthone) (trade name, manufactured by Nippon Kayaku Co., Ltd.), Lucirin TPO, LR8893, and LR8970 (manufactured by BASF Corporation), and UBECRYL P36 (manufactured by UCB Corporation).

These photopolymerization initiators may be used alone or in combination of two or more.

The content of the photopolymerization initiator is preferably 5 to 20% by mass and more preferably 5 to 15% by mass relative to the total mass (100% by mass) of the ink composition in order to achieve the excellent curability by improving the ultraviolet curing rate and avoid coloring due to the photopolymerization initiator and avoid the photopolymerization initiator from remaining undissolved.

In particular, when the photopolymerization initiator contains an acylphosphine oxide compound, the content of the acylphosphine oxide compound is preferably 6 to 13% by mass and more preferably 7 to 12% by mass relative to the total mass (100% by mass) of the ink composition. This is because a satisfactory curing rate can be achieved by curing with LED (preferably, emission peak wavelength: 350 nm to 420 nm), thereby exhibiting more excellent curability.

[Colorant]

The ink composition according to the embodiment may further contain a colorant. As the colorant, at least one of a pigment and a dye can be used.

(Pigment)

In the embodiment, the light resistance of the ink composition can be improved by using a pigment as the colorant. As the pigment, either an inorganic pigment or an organic pigment can be used.

Usable examples of the inorganic pigment include carbon black (C. I. Pigment Black 7) such as furnace black, lamp black, acetylene black, channel black, and the like, iron oxide, and titanium oxide.

Usable examples of the organic pigment include azo pigments such as insoluble azo pigments, condensed azo pigments, azo-lakes, chelate azo pigments, and the like; polycyclic pigments such as phthalocyanine pigments, perylene and perynone pigments, anthraquinone pigments, quinacridone pigments, dioxane pigments, thioindigo pigments, isoindolinone pigments, quinophthalone pigments, and the like; dye chelates (e.g., basic dye-type chelates, acid dye-type chelates, and the like), dye lakes (basic dye-type lakes and acid dye-type lakes), nitro pigments, nitroso pigments, aniline black, and daylight fluorescent pigments.

In further detail, examples of carbon black used as a black ink include No. 2300, No. 900, MCF88, No. 33, No. 40, No. 45, No. 52, MA7, MA8, MA100, No. 2200B, and the like (trade names, manufactured by Mitsubishi Chemical Corporation), Raven 5750, Raven 5250, Raven 5000, Raven 3500, Raven 1255, Raven 700, and the like (trade names, manufactured by Carbon Columbia Corporation), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (trade names, manufactured by CABOT JAPAN K.K.), and Color Black FW1, Color Black FW2, Color Black FW2V, Color Black FW18, Color Black FW200, Color Black 5150, Color Black 5160, Color Black S170, Printex 35, Printex U, Printex V, Printex 140U, Special Black 6, Special Black 5, Special Black 4A, Special Black 4, and the like (trade names, manufactured by Degussa Corporation).

Examples of a pigment used as a white ink include C. I. Pigment White 6, 18, and 21.

Examples of a pigment used as a yellow ink include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of a pigment used as a magenta ink include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C. I. Pigment Violet 19, 23, 32, 33, 36, 38, 43, and 50.

Examples of a pigment used as a cyan ink include C. I. Pigment Blue 1, 2, 3, 15, 15:1, 15:2, 15:3, 15:34, 15:4, 16, 18, 22, 25, 60, 65, and 66, and C. I. Vat Blue 4 and 60.

Examples of pigments other than magenta, cyan, yellow include C. I. Pigment Green 7 and 10, C. I. Pigment Brown 3, 5, 25, and 26, C. I. Pigment Orange 1, 2, 5, 7, 13, 14, 15, 16, 24, 34, 36, 38, 40, 43, and 63.

These pigments may be used alone or in combination of two or more.

(Dye)

In the embodiment, a dye can be used as the colorant. The dye is not particularly limited, and an acid dye, a direct dye, a reactive dye, and a basic dye can be used. Examples of the dye include C. I. Acid Yellow 17, 23, 42, 44, 79, and 142, C. I. Acid Red 52, 80, 82, 249, 254, and 289, C. I. Acid Blue 9, 45, and 249, C. I. Acid Black 1, 2, 24, and 94, C. I. Food Black 1 and 2, C. I. Direct Yellow 1, 12, 24, 33, 50, 55, 58, 86, 132, 142, 144, and 173, C. I. Direct Red 1, 4, 9, 80, 81, 225, and 227, C. I. Direct Blue 1, 2, 15, 71, 86, 87, 98, 165, 199, and 202, C. I. Direct Black 19, 38, 51, 71, 154, 168, 171, and 195, C. I. Reactive Red 14, 32, 55, 79, and 249, and C. I. Reactive Black 3, 4, and 35.

These dyes may be used alone or in combination of two or more.

The content of the colorant is preferably 1 to 20% by mass relative to the total mass (100% by mass) of the ink composition because good coloring properties can be exhibited, and the inhibition of curing of a coating film due to light absorption by the colorant can be decreased. An ink composition containing a colorant is generally inferior to an ink composition not containing a colorant in curability and, particularly, internal curability of a thick film when thick-film recording is performed. However, the photocurable ink composition according to the embodiment can produce a good recorded material by using a predetermined configuration even when containing a colorant.

[Dispersant]

When the ink composition according to the embodiment contains a pigment, the ink composition may further contain a dispersant for improving pigment dispersibility. Examples of the dispersant include, but are not limited to, dispersants such as polymeric dispersants commonly used for preparing pigment dispersion solutions. Specific examples thereof include those each containing, as a main component, at least one of polyoxyalkylene polyalkylene polyamines, vinyl polymers and copolymers, acryl polymers and copolymers, polyesters, polyamides, polyimides, polyurethanes, amino polymers, silicon-containing polymers, sulfur-containing polymers, fluorine-containing polymers, and epoxy resins. Commercial products of the polymeric dispersants include Ajisper Series (trade name) manufactured by Ajinomoto Fine-Techno Co., Inc., Solsperse Series (Solsperse 32000, 36000, etc. (trade name)) available from Avecia Co., Disperbyk Series (trade name) manufactured by BYK Chemie Co., Ltd. and Disparlon Series (trade name) manufactured by Kusumoto Chemical Ltd.

These dispersants may be used alone or in combination of two or more. The content of the dispersant is not particularly limited, and the dispersant may be added in an appropriate desired amount.

[Other Additives]

The ink composition according to the embodiment may further contain additives (components) other than the above-described additives. These components are not particularly limited, but, for example, a generally known polymerization accelerator, polymerization inhibitor, slipping agent (surfactant), permeation accelerator, and wetting agent (humectant), and other additives can be used. Examples of the other additives include a generally known fixing agent, fungicide, antiseptic, antioxidant, ultraviolet absorber, chelating agent, pH adjuster, and thickener.

In addition, the ink composition can be cured by irradiation with ultraviolet light preferably having an emission peak wavelength within the range of 350 to 420 nm, more preferably 360 to 400 nm. When the ink composition of the embodiment can be cured at an emission peak wavelength within the above-described range, the ink composition can be rapidly cured with low energy due to the composition. In particular, the possibility of curing with low energy preferably leads to the possibility of using a light-emitting diode (LED), which has recently attracted attention from the environmental viewpoint, as an ultraviolet irradiation source. That is, the ink composition of the embodiment of the present invention is excellent in curability with LED.

In addition, the ink composition is preferably cured with an ultraviolet irradiation energy of 300 $mJ/cm^2$ or less, more preferably 200 $mJ/cm^2$ or less. By using the ink composition, an image can be formed at low cost. The irradiation energy is calculated by multiplying the irradiation time by the irradiation intensity.

According to the embodiment, it is possible to provide the photocurable ink composition for ink jet recording which has excellent curability and excellent extensibility of a cured film, and which is capable of preventing the occurrence of curing wrinkles when a thick film is cured.

[Recording Medium]

The ink composition according to the embodiment of the present invention is ejected on a recording medium by an ink jet recording method described below to form a recorded material. As the recording medium, for example, an absorbent or non-absorbent recording medium can be used. The ink jet recording method according to an embodiment described below can be widely applied to recording media having various absorption performances, ranging from a non-absorbent recording medium which an aqueous ink hardly permeates to an absorbent recording medium which an aqueous ink easily permeates. However, when the ink composition is applied to the non-absorbent recording medium, a drying step may be required after curing by ultraviolet irradiation.

Examples of the absorbent recording medium include, but are not limited to, plain paper such as electrophotographic paper with high permeability to aqueous ink, ink jet paper (ink jet exclusive paper provided with an ink-absorbing layer composed of silica particles or alumina particles or an ink-absorbing layer composed of a hydrophilic polymer such as polyvinyl alcohol (PVA), polyvinylpyrrolidone (PVP), or the like), and art paper, coated paper, cast paper, and the like which have relatively low permeability to aqueous ink and which are used for general offset printing.

Examples of the non-absorbent recording medium include, but are not limited to, plastic films, sheets, and plates of polyvinyl chloride (PVC), polyethylene, polypropylene, polyethylene terephthalate (PET), and the like; metal plates of iron, silver, copper, aluminum, and the like; metal plates and plastic films produced by vapor-depositing any one of the metals; alloy plates of stainless, brass, and the like.

[Ink Jet Recording Method]

An embodiment of the present invention relates to an ink jet recording method. The photocurable ink composition for ink jet recording according to the above-described embodiment of the present invention can be used in the ink jet recording method according to this embodiment. The ink jet recording method of the embodiment includes an ejection step of ejecting the ink composition on a recording medium, and a curing step of curing the ink composition by ultraviolet irradiation of the ink composition ejected in the ejection step. Therefore, an image, i.e., a coating film (cured film), is formed of the ink composition cured on the recording medium.

[Ejection Step]

In the ejection step, the ink composition is ejected on the recording medium and adheres to the recording medium. The viscosity of the ink composition during ejection is preferably 5 to 30 mPa·s. When the viscosity of the ink composition is the above-described value under a condition where the ink composition is at room temperature or is not heated, the ink composition may be ejected at room temperature or without heating. In this case, the ink temperature during ejection is preferably 20 to 30° C. On the other hand, the ink composition may be ejected with desired viscosity by heating to a predetermined temperature. In this way, good ejection stability can be realized.

The photocurable ink composition for ink jet recording of the embodiment of the present invention has higher viscosity than that of a usual aqueous ink composition and thus causes a large change in viscosity with a temperature change during ejection. Such a change in viscosity of the ink greatly influences a change in droplet size and a change in droplet ejection rate, resulting in the occurrence of deterioration in image quality. Therefore, the temperature of ink during ejection is preferably maintained as constant as possible.

[Curing Step]

In the next curing step, the ink composition ejected and adhering to the recording medium is cured by light (ultraviolet light) irradiation. This is due to that the photopolymerization initiator contained in the ink composition is decomposed by ultraviolet irradiation to produce initiation species such as radical, acid, and base, thereby accelerating polymerization reaction of the polymerizable compounds by the function of the initiation species. Alternatively, the polymerization reaction of the polymerizable compounds is initiated by ultraviolet irradiation. In this case, when a sensitizing dye is present together with the photopolymerization initiator in the ink composition, the sensitizing dye in the system comes into an excited state by absorbing ultraviolet light and accelerates decomposition of the photopolymerization initiator by contact with the photopolymerization initiator, so that high-sensitivity curing reaction can be achieved.

A mercury lamp, a gas/solid-state laser, and the like are mainly used as ultraviolet sources, and a mercury lamp and a metal halide lamp are widely known as light sources used for curing photocurable ink compositions for ink jet recording.

On the other hand, at present, a mercury-free type is strongly demanded from the viewpoint of environmental protection, and the replacement by a GaN-based semiconductor ultraviolet light-emitting device is very useful from the industrial and environmental viewpoint. Further, an ultraviolet light-emitting diode (UV-LED) and an ultraviolet laser diode (UV-LD) have a small size, long life, high efficiency, and low cost, and are thus expected as a light source for photocurable ink jet. In particular, UV-LED is preferred.

In addition, the photocurable ink composition for ink jet recording which can be cured preferably with an irradiation energy of 300 mJ/cm$^2$ or less may be preferably used in the ink jet recording method using a UV-LED having an emission peak wavelength within the range of 350 to 420 nm because the output of LED can be easily increased. In this case, low-cost printing and a high printing speed can be realized. Such an ink composition can be produced by containing at least one of the photopolymerization initiator which is decomposed by irradiation with ultraviolet light within the above-described wavelength range and the polymerizable compound which is initiated to be polymerized by irradiation with ultraviolet light within the above-described wavelength range.

According to the embodiment, it is possible to provide the low-cost ink jet recording method having a high printing speed and contributing to environmental protection by using the photocurable ink composition for ink jet recording which has excellent curability and excellent extensibility of a cured film and which is capable of preventing the occurrence of curing wrinkles when a thick film is cured.

EXAMPLES

The first embodiment of the present invention is described in further detail below with reference to examples, but the embodiment is not limited to these examples.
[Components Used]
The components used in examples and comparative examples described below are as follows.
[Pigment]
  IRGALITE BLUE GLVO (cyan pigment (C. I. Pigment Blue 15:4), trade name, manufactured by BASF Corporation, abbreviated as "BLUE GLVO" hereinafter)
[Dispersant]
  Solsperse 32000 (trade name, manufactured by LUBRIZOL Corporation, abbreviated as "SOL32000" hereinafter) [Vinyl ether group-containing (meth)acrylate]
  VEEA (2-(2-vinyloxyethoxy)ethyl acrylate, trade name, manufactured by Nippon Shokubai Co., Ltd., abbreviated as "VEEA" hereinafter). In tables below, the vinyl ether group-containing (meth)acrylate is shown as "Acryl vinyl-containing monomer".
[Monofunctional (Meth)Acrylate]
  Viscoat #192 (phenoxyethyl acrylate, trade name, manufactured by OSAKA ORGANIC CHEMICAL INDUSTRY LTD., abbreviated as "PEA" hereinafter)
  IBXA (isobornyl acrylate, trade name, manufactured by OSAKA ORGANIC CHEMICAL INDUSTRY LTD., abbreviated as "IBXA" hereinafter)
[Polyfunctional (Meth)Acrylate]
  NK Ester APG-100 (dipropylene glycol diacrylate, trade name, manufactured by SHIN-NAKAMURA CHEMICAL CO., LTD., abbreviated as "DPGDA" hereinafter)
  NK Ester APG-200 (tripropylene glycol diacrylate, trade name, manufactured by SHIN-NAKAMURA CHEMICAL CO., LTD., abbreviated as "TPGDA" hereinafter)
[Photopolymerization Initiator]
  IRGACURE 819 (trade name, manufactured by BASF Corporation, solid content 100%, abbreviated as "819" hereinafter)
  Speedcure TPO (trade name, manufactured by Lambson Ltd., solid content 100%, abbreviated as "TPO" hereinafter)
  Speedcure DETX (trade name, manufactured by Lambson Ltd., solid content 100%, abbreviated as "DETX" hereinafter)
[Polymerization Inhibitor]
  p-Methoxyphenol (trade name, manufactured by Tokyo Chemical Industry Co., Ltd., p-methoxyphenol, abbreviated as "MEHQ" hereinafter)
[Slipping Agent]
  BYK-UV3500 (trade name, manufactured by BYK Corporation, abbreviated as "UV3500" hereinafter)

Examples 1 to 16 and Comparative Examples 1 to 6

Preparation of Pigment Dispersion Solution

A pigment dispersion solution was prepared prior to preparation of an ink composition. A pigment, a dispersant, and polymerizable compounds described in "Dispersion-derived monomer" of Tables 1 and 2 below were mixed to have each of the compositions (unit: % by mass) shown in Tables 1 and 2 below, followed by stirring with a stirrer for 1 hour. After stirring, the resultant mixture was dispersed with a beads mill to prepare a pigment dispersion solution. Dispersion was performed with zirconia beads having a diameter of 0.65 mm and packed at a packing rate of 70% under the conditions including a peripheral speed of 9 m/s and a dispersion time of 2 to 4 hours.
[Preparation of Ink Composition]
The components shown in Tables 1 and 2 below were added and mixed to have each of the compositions (unit: % by mass) shown in Tables 1 and 2 below (a pigment, a dispersant, and polymerizable compounds described in "Dispersion-derived monomer" of Tables 1 and 2 below were mixed as the pigment dispersion solution). The resultant mixture was stirred with a high-speed water-cooled stirrer to prepare a cyan-color photocurable ink composition for ink jet recording.

TABLE 1

|  |  | Example 1 | Example 2 | Example 3 | Example 4 | Example 5 | Example 6 |
|---|---|---|---|---|---|---|---|
| Pigment | BLUE GLVO | 2.0 | 2.0 | 2.0 | 2.0 | 2.0 | 2.0 |
| Dispersant | SOL32000 | 0.5 | 0.5 | 0.5 | 0.5 | 0.5 | 0.5 |
| Dispersion-derived monomer | PEA | 7.5 | 7.5 | 7.5 | 7.5 | 7.5 | 7.5 |
|  | IBXA |  |  |  |  |  |  |
| Acryl vinyl ether-containing monomer | VEEA | 20.0 | 10.0 | 30.0 | 20.0 | 20.0 | 28.0 |

TABLE 1-continued

|  |  |  |  |  |  |  |  |
|---|---|---|---|---|---|---|---|
| Monofunctional monomer | PEA | 24.5 | 30.0 | 25.5 | 13.5 | 31.5 | 3.5 |
|  | IBXA |  |  |  |  |  |  |
| Polyfunctional monomer | DPGDA | 31.8 | 31.8 | 20.8 | 42.8 | 24.8 | 36.8 |
|  | TPGDA |  | 4.5 |  |  |  | 8.0 |
| Polymerization inhibitor | MEHQ | 0.2 | 0.2 | 0.2 | 0.2 | 0.2 | 0.2 |
| Slipping agent | UV3500 | 0.2 | 0.2 | 0.2 | 0.2 | 0.2 | 0.2 |
| Photopolymerization initiator | 819 | 6.0 | 6.0 | 6.0 | 6.0 | 6.0 | 6.0 |
|  | TPO | 4.8 | 4.8 | 4.8 | 4.8 | 4.8 | 4.8 |
|  | DETX | 2.5 | 2.5 | 2.5 | 2.5 | 2.5 | 2.5 |
| Total |  | 100.0 | 100.0 | 100.0 | 100.0 | 100.0 | 100.0 |
| PEA total |  | 32.0 | 37.5 | 33.0 | 21.0 | 39.0 | 11.0 |
| (819 + TPO) total |  | 10.8 | 10.8 | 10.8 | 10.8 | 10.8 | 10.8 |

|  |  |  | Example 7 | Example 8 | Example 9 | Example 10 |
|---|---|---|---|---|---|---|
| Pigment |  | BLUE GLVO | 2.0 | 2.0 | 2.0 | 2.0 |
| Dispersant |  | SOL32000 | 0.5 | 0.5 | 0.5 | 0.5 |
| Dispersion-derived monomer |  | PEA | 7.5 | 7.5 | 7.5 | 7.5 |
|  |  | IBXA |  |  |  |  |
| Acryl vinyl ether-containing monomer |  | VEEA | 10.0 | 10.0 | 30.0 | 20.0 |
| Monofunctional monomer |  | PEA | 42.5 | 51.3 | 1.5 | 27.8 |
|  |  | IBXA |  |  |  |  |
| Polyfunctional monomer |  | DPGDA | 19.3 | 10.5 | 32.8 | 31.8 |
|  |  | TPGDA | 4.5 | 4.5 | 12.0 |  |
| Polymerization inhibitor |  | MEHQ | 0.2 | 0.2 | 0.2 | 0.2 |
| Slipping agent |  | UV3500 | 0.2 | 0.2 | 0.2 | 0.2 |
| Photopolymerization initiator |  | 819 | 6.0 | 6.0 | 6.0 | 4.0 |
|  |  | TPO | 4.8 | 4.8 | 4.8 | 3.5 |
|  |  | DETX | 2.5 | 2.5 | 2.5 | 2.5 |
| Total |  |  | 100.0 | 100.0 | 100.0 | 100.0 |
| PEA total |  |  | 50.0 | 58.8 | 9.0 | 35.3 |
| (819 + TPO) total |  |  | 10.8 | 10.8 | 10.8 | 7.5 |

TABLE 2

|  |  | Example 11 | Example 12 | Example 13 | Example 14 | Example 15 | Comp. Example 1 |
|---|---|---|---|---|---|---|---|
| Pigment | BLUE GLVO | 2.0 | 2.0 | 2.0 | 2.0 | 2.0 | 2.0 |
| Dispersant | SOL32000 | 0.5 | 0.5 | 0.5 | 0.5 | 0.5 | 0.5 |
| Dispersion-derived monomer | PEA | 7.5 | 7.5 | 7.5 | 7.5 | 7.5 | 7.5 |
|  | IBXA |  |  |  |  |  |  |
| Acryl vinyl ether-containing monomer | VEEA | 20.0 | 20.0 | 20.0 | 35.0 | 45.0 |  |
| Monofunctional monomer | PEA | 27.8 | 27.8 | 27.8 | 30.0 | 10.0 | 10.0 |
|  | IBXA |  |  |  |  | 11.3 | 10.0 |
| Polyfunctional monomer | DPGDA | 24.8 | 29.3 | 25.3 | 5.8 | 10.0 | 30.0 |
|  | TPGDA |  |  |  | 5.5 |  | 26.3 |
| Polymerization inhibitor | MEHQ | 0.2 | 0.2 | 0.2 | 0.2 | 0.2 | 0.2 |
| Slipping agent | UV3500 | 0.2 | 0.2 | 0.2 | 0.2 | 0.2 | 0.2 |
| Photopolymerization initiator | 819 | 8.0 | 8.0 | 8.0 | 6.0 | 6.0 | 6.0 |
|  | TPO | 6.5 | 2.0 | 6.0 | 4.8 | 4.8 | 4.8 |
|  | DETX | 2.5 | 2.5 | 2.5 | 2.5 | 2.5 | 2.5 |
| Total |  | 100.0 | 100.0 | 100.0 | 100.0 | 100.0 | 100.0 |
| PEA total |  | 35.3 | 35.3 | 35.3 | 37.5 | 17.5 | 17.5 |
| (819 + TPO) total |  | 14.5 | 10.0 | 14.0 | 10.8 | 10.8 | 10.8 |

|  |  | Comp. Example 2 | Comp. Example 3 | Comp. Example 4 | Comp. Example 5 | Comp. Example 6 |
|---|---|---|---|---|---|---|
| Pigment | BLUE GLVO | 2.0 | 2.0 | 2.0 |  |  |
| Dispersant | SOL32000 | 0.5 | 0.5 | 0.5 |  |  |
| Dispersion-derived monomer | PEA |  |  | 7.5 |  | 7.5 |
|  | IBXA | 7.5 | 7.5 |  | 7.5 |  |
| Acryl vinyl ether-containing monomer | VEEA | 20.0 | 20.0 |  | 20.0 |  |

TABLE 2-continued

| | | | | | | |
|---|---|---|---|---|---|---|
| Monofunctional monomer | PEA | | | 31.3 | | 31.3 |
| | IBXA | 26.3 | | | 28.8 | |
| Polyfunctional monomer | DPGDA | 30.0 | 28.3 | 10.0 | 30.0 | 12.5 |
| | TPGDA | | 28.0 | 35.0 | | 35.0 |
| Polymerization inhibitor | MEHQ | 0.2 | 0.2 | 0.2 | 0.2 | 0.2 |
| Slipping agent | UV3500 | 0.2 | 0.2 | 0.2 | 0.2 | 0.2 |
| Photopolymerization initiator | 819 | 6.0 | 6.0 | 6.0 | 6.0 | 6.0 |
| | TPO | 4.8 | 4.8 | 4.8 | 4.8 | 4.8 |
| | DETX | 2.5 | 2.5 | 2.5 | 2.5 | 2.5 |
| Total | | 100.0 | 100.0 | 100.0 | 100.0 | 100.0 |
| PEA total | | 0.0 | 0.0 | 38.8 | 0.0 | 38.8 |
| (819 + TPO) total | | 10.8 | 10.8 | 10.8 | 10.8 | 10.8 |

[Evaluation Item]

The photocurable ink composition for ink jet recording prepared in each of the examples and the comparative examples was evaluated with respect to viscosity, solubility of the photopolymerization initiator, curability, adhesion, and abrasion resistance by methods described below.

(1. Viscosity)

The viscosity of the ink composition of each of the examples and the comparative examples was measured with a DVM-E-type rotary viscometer (manufactured by TOKYO KEIKI INC.) under the conditions of a temperature of 25° C. and a rotational speed of 10 rpm. The evaluation criteria were as described below. The evaluation results are shown in Tables 3 and 4 below.

A: 25 mPa·s or less
B: over 25 mPa·s and less than 35 mPa·s
C: 35 mPa·s or more (2. Solubility of Photopolymerization Initiator)

A pigment-free ink composition was prepared by the same method as in the above-described examples and comparative examples except that the components other than the pigment and the pigment dispersant were used. The resultant mixture was sufficiently stirred to prepare an ink composition. Then, whether or not the photopolymerization initiator remained undissolved was visually observed. The ink composition without the photopolymerization initiator remaining undissolved was placed in a constant-temperature oven of 0° C., taken out 24 hours after, and retuned to room temperature. Then, whether or not the photopolymerization initiator precipitated was again visually observed.

The evaluation criteria were as described below. The evaluation results are shown in Tables 3 and 4 below. In Tables 3 and 4, this evaluation item is abbreviated as "Initiator solubility".

A: Undissolved residue and precipitation of the photopolymerization initiator were not observed both after stirring at room temperature and after storage at 0° C.

B: Undissolved residue of the photopolymerization initiator was not observed after stirring at room temperature but precipitation of the photopolymerization initiator was observed after storage at 0° C.

C: Undissolved residue of the photopolymerization initiator was observed after stirring at room temperature (3. Curability)

An ink jet recording apparatus provided with piezo-type ink jet nozzles was used, and the nozzle array was filled with the ink composition of each of the examples and the comparative examples. A solid pattern image (recording resolution: 720×720 dpi) was printed on a PVC sheet (Flontlite Grossy 120 g (trade name), manufactured by Cooley Co., Ltd.) at normal temperature and normal pressure while the amount of ink ejected was controlled so that the thickness of a printed matter (recorded material) was 10 μm. In this case, each of the ink compositions exhibited good ejection properties. In addition, the solid pattern image was cured by increasing the number of paths until the image became tack-free using UV-LED in an ultraviolet irradiation apparatus provided at the side of a carriage under irradiation conditions of an irradiation intensity of 1 W/cm$^2$, and an ultraviolet peak wavelength of 395 nm, an irradiation energy of 100 mJ/cm$^2$ per path. As a result, a recorded material having the solid pattern image printed on the PVC sheet was formed.

The "solid pattern image" is an image in which dots are recorded in all pixels in a minimum recording unit region defined by the recording resolution. The "number of paths" represents the number of times of ultraviolet irradiation performed on a coating film by moving a head provided with the ultraviolet irradiation apparatus toward the recorded material. The irradiation energy (mJ/cm$^2$) was determined by measuring the irradiation intensity (mW/cm$^2$) on a surface irradiated from the light source and multiplying the irradiation intensity by the irradiation duration time (s). The irradiation intensity was measured using an ultraviolet ray intensity meter UM-10 and a light receiving unit UM-400 (both manufactured by KONICA MINOLTA SENSING, INC.).

The curability of a coating film was evaluated using as an index the irradiation energy when it was tack-free. Whether or not a coating film became tack-free was determined under conditions described below. That is, it was determined whether or not an ink adhered to a cotton-tipped swab or whether or not an ink cured product on a recording medium was scratched. When the ink did not adhere to the cotton-tipped swab and the ink cured product on the recording medium was not scratched, the coating film was determined as being "tack-free". In this case, the cotton-tipped swab used was a Johnson cotton-tipped swab manufactured by Johnson & Johnson Co. Ltd. The number of rubbing cycles was 10, and the rubbing strength was a 100-g load.

The evaluation criteria were as described below. The evaluation results are shown in Tables 3 and 4 below.

A: 200 mJ/cm$^2$ or less
B: Over 200 mJ/cm$^2$ and 300 mJ/cm$^2$ or less
C: Over 300 mJ/cm$^2$ (4. Adhesion)

The recorded material formed by ultraviolet irradiation curing until it became tack-free in the test of "3. Curability" was used. According to JIS K-5600-5-6 (ISO2409) (General Testing Methods for paints-Part 5: Mechanical properties of films-Section 6: Adhesion (cross-cut method)), a coating film surface of the recorded material was cross-cut and subjected to a peel test using a cellophane tape. On the basis of the results of the peel test, adhesion was evaluated according to ranks A to E below. The cross-cut method is described below.

A single-edge cutting tool (general commercial cutter) serving as a cutting tool and a guide for cutting at equal intervals using the single-edge cutting tool were prepared.

First, the cutting tool was applied perpendicularly to a coating film to make 6 cuts in the recorded material. After the 6 cuts were made, the direction of the cutting tool was changed by 90°, and 6 cuts were further made to be perpendicular to the previously made cuts.

Next, a transparent adhesive tape (width 25±1 mm) was drawn to a length of about 75 mm, attached to a cross-cut portion formed on the coating film, and sufficiently rubbed with a finger so that the coating film could be seen through the tape. Then, within 5 minutes after application, the tape was securely peeled at an angle close to 60° over 0.5 to 1.0 second.

The evaluation criteria were as described below. A value of each rank was determined by rounding off a calculated peeling rate to the nearest number. The evaluation results are shown in Tables 3 and 4 below.

A: Peeling rate of 0 to 5%
B: Peeling rate of 6 to 15%
C: Peeling rate of 16 to 35%
D: Peeling rate of 36 to 65%
E: Peeling rate of 66 to 100%

(5. Abrasion Resistance)

According to JIS K5701 (ISO 11628) (definition of testing methods for lithographic inks, colored samples, and prints), abrasion resistance was evaluated using a Gakushin-type rubbing fastness tester (manufactured by TESTER SANGYO CO., LTD.). An evaluation method included placing canequim on a surface of the recorded material produced in the test of "3. Curability", rubbing with a load of 500 g, and visually observing peeling on the cured surface of the recorded material after rubbing.

The evaluation criteria are as follows. The evaluation results are shown in Tables 3 and 4 below.

A: No stain was observed on canequim, and neither peel nor scratch was observed on the recorded surface.

B: Stain was observed on canequim, but neither peel nor scratch was observed on the recorded surface.

C: Stain was observed on canequim, and peel and linear scratch were slightly observed on the recorded surface.

A: Stain was observed on canequim, and peel and scratch was significantly observed on the recorded surface.

(meth)acrylate represented by the general formula (I) and the phenoxyethyl (meth)acrylate, and the photopolymerization initiator has, as compared with the ink composition for which this is not true (each comparative example), excellent curability, low viscosity, and excellent solubility of the photopolymerization initiator, adhesion, and abrasion resistance. In addition, the ink compositions of Comparative Examples 5 and 6 are ink compositions without containing the colorant and the dispersant of Comparative Examples 2 and 4, respectively, and have good curability and improved adhesion and abrasion resistance as compared with Comparative Examples 2 and 4, respectively, but cannot be used for recording images because of the absence of the colorant. Further, although not shown in the tables, curability evaluation was performed under the same conditions as in Example 1 except that the irradiation intensity of UV-LED was 500 mW/cm$^2$, and the irradiation energy per path was adjusted to the same as in the example by extending the irradiation time per path. As a result, curability was evaluated as "B", and wrinkles were observed in a surface of the solid pattern.

The second embodiment of the present invention is described in further detail below with reference to examples, but the embodiment is not limited to these examples.

[Components Used]

The components used in examples and comparative examples below are as follows.

[Vinyl Ether Group-Containing (Meth)Acrylate]

VEEA (2-(2-vinyloxyethoxy)ethyl acrylate, trade name, manufactured by Nippon Shokubai Co., Ltd., abbreviated as "VEEA" hereinafter).

[Monofunctional (Meth)Acrylate]

2-MTA (2-methoxyethyl acrylate, trade name, manufactured by OSAKA ORGANIC CHEMICAL INDUSTRY LTD., abbreviated as "2MEA" hereinafter)

3-MBA (3-methoxybutyl acrylate, trade name, manufactured by OSAKA ORGANIC CHEMICAL INDUSTRY LTD., abbreviated as "3 MBA" hereinafter)

V#160 (benzyl acrylate, trade name, manufactured by Hitachi Chemical Co., Ltd., abbreviated as "BZA" hereinafter)

TABLE 3

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Curability | A | B | A | A | A | A | B | B | B | B |
| Viscosity | A | A | A | A | A | A | A | A | A | A |
| Adhesion | A | A | A | A | A | A | A | B | A | A |
| Abrasion resistance | A | A | A | A | A | A | A | A | A | A |
| Initiator solubility | A | A | A | A | A | A | A | A | B | A |

TABLE 4

|  | Example 11 | Example 12 | Example 13 | Example 14 | Example 15 | Comparative Example 1 | Comparative Example 2 | Comparative Example 3 | Comparative Example 4 | Comparative Example 5 | Comparative Example 6 |
|---|---|---|---|---|---|---|---|---|---|---|---|
| Curability | A | A | A | A | A | C | C | C | C | B | B |
| Viscosity | A | A | A | A | A | C | A | B | C | A | C |
| Adhesion | A | A | A | B | B | C | C | B | D | B | C |
| Abrasion resistance | A | A | A | B | B | A | A | B | C | A | B |
| Initiator solubility | B | A | A | A | A | C | C | C | A | C | A |

The above results indicate that the photocurable ink composition (each of the examples) containing the polymerizable compounds including the vinyl ether group-containing FA-THFA (tetrahydrofurfuryl acrylate, trade name, manufactured by Hitachi Chemical Co., Ltd., abbreviated as "THFA" hereinafter)

SR395 (isodecyl acrylate, trade name, manufactured by Sartomer Company, abbreviated as "IDA" hereinafter)

LA (lauryl acrylate, trade name, manufactured by OSAKA ORGANIC CHEMICAL INDUSTRY LTD., abbreviated as "LA" hereinafter)

MEDOL10 ((2-methyl-2-ethyl-1,3-dioxolan-4-yl)methyl acrylate, trade name, manufactured by OSAKA ORGANIC CHEMICAL INDUSTRY LTD.)

V#150D (tetrahydrofurfuryl oligoacrylate, manufactured by OSAKA ORGANIC CHEMICAL INDUSTRY LTD., abbreviated as "THFOA" hereinafter)

IBXA (isobornyl acrylate, trade name, trade name, manufactured by OSAKA ORGANIC CHEMICAL INDUSTRY LTD., abbreviated as "IBXA" hereinafter)

4-HBA (4-hydroxybutyl acrylate, trade name, manufactured by OSAKA ORGANIC CHEMICAL INDUSTRY LTD., abbreviated as "4HBA" hereinafter)

ACMO (acryloylmorpholine, trade name, manufactured by Kohjin Co., Ltd., abbreviated as "ACMO" hereinafter)

Viscoat #192 (phenoxyethyl acrylate, trade name, manufactured by OSAKA ORGANIC CHEMICAL INDUSTRY LTD., abbreviated as "PEA" hereinafter Light acrylate P2H-A (phenoxydiethylene glycol acrylate, trade name, manufactured by Kyoeisha Chemical Co., Ltd., abbreviated as "PDEGA" hereinafter)

FA-513AS (dicyclopentanyl acrylate, trade name, manufactured by Hitachi Chemical Co., Ltd., abbreviated as "DCPtaA" hereinafter)

FA-511AS (dicyclopentenyl acrylate, trade name, manufactured by Hitachi Chemical Co., Ltd., abbreviated as "DCPteA" hereinafter)

FA-512AS (dicyclopentenyloxyethyl acrylate, trade name, manufactured by Hitachi Chemical Co., Ltd., abbreviated as "DCPteOEA" hereinafter)

DA-141 (2-hydroxy-3-phenoxypropyl acrylate, trade name, manufactured by Nagasechemtex Corporation, abbreviated as "HPPA" hereinafter)

[Other Monofunctional Polymerizable Compound]

NVF (N-vinylformamide, trade name, manufactured by Arakawa Chemical Industries, Ltd., abbreviated as "NVF" hereinafter)

V-CAP (N-vinylcaprolactam, trade name, manufactured by ISP Japan Ltd., abbreviated as "NVC" hereinafter)

[Polyfunctional (Meth)Acrylate]

NK Ester APG-100 (dipropylene glycol diacrylate, trade name, manufactured by SHIN-NAKAMURA CHEMICAL CO., LTD., abbreviated as "2PGA" hereinafter)

NK Ester APG-200 (tripropylene glycol diacrylate, trade name, manufactured by SHIN-NAKAMURA CHEMICAL CO., LTD., abbreviated as "3PGA" hereinafter)

R-684 (dimethyloltricyclodecane diacrylate, trade name, manufactured by Nippon Kayaku Co., Ltd., abbreviated as "DMTCDDA" hereinafter)

A-DPH (dipentaerythritol hexaacrylate, trade name, manufactured by SHIN-NAKAMURA CHEMICAL CO., LTD., abbreviated as "DPHA" hereinafter)

EBECRYL8402 (urethane acrylate oligomer, trade name, manufactured by DAICEL-CYTEC Co, Ltd., abbreviated as "UA" hereinafter)

[Other Polyfunctional Polymerizable Compound]

TDVE (triethylene glycol divinyl ether, trade name, manufactured by Maruzen Petrochemical CO, LTD., abbreviated as "TEG-DVE" hereinafter)

[Photopolymerization Initiator]

IRGACURE 819 (trade name, manufactured by BASF corporation, solid content 100%, abbreviated as "819" hereinafter)

DAROCUR TPO (trade name, manufactured by BASF Corporation, solid content 100%, abbreviated as "TPO" hereinafter)

KAYACURE DETX-S (trade name, manufactured by Nippon Kayaku Co., Ltd., solid content 100%, abbreviated as "DETX-S" hereinafter)

[Pigment]

MICROLITH-WA Black C-WA (color index name: C. I. Pigment Black 7, trade name, manufactured by BASF Corporation, abbreviated as "Black" hereinafter)

[Dispersant]

Solsperse 36000 (trade name, manufactured by LUBRIZOL Corporation, abbreviated as "SOL36000" hereinafter)

Examples 1 to 33, Comparative Examples 1 to 19, and Reference Example 1

The components shown in tables below were mixed to have each of the compositions (unit: % by mass) shown in the tables, and the resultant mixture was stirred with a high-speed water-cooled stirrer to prepare a black-color photocurable ink composition for ink jet recording. All monofunctional acrylates used in the examples had a P. I. I. of 0 to 4. In the tables, a blank without a numerical value indicates no addition.

TABLE 5

| Component name | Abbreviation | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Acryl vinyl-containing monomer | VEEA | 10.00 | 10.00 | 10.00 | 20.00 | 20.00 | 20.00 | 20.00 | 20.00 | 20.00 | 20.00 |
| Monofunctional (meth)-acrylate | 2MEA | | | | | | 10.00 | | | | |
| | 3MBA | | | | | | | 10.00 | | | |
| | BZA | | | | | | | | 10.00 | | |
| | THFA | | | 5.00 | 5.00 | | | | | 10.00 | |
| | IDA | | | | | | | | | | 10.00 |
| | 4HBA | 10.00 | | 10.00 | 10.00 | 10.00 | | | | | |
| | PEA | 30.00 | 30.00 | 30.00 | 30.00 | 30.00 | 30.00 | 30.00 | 30.00 | 30.00 | 30.00 |
| | DCPteA | | | 10.00 | 5.00 | | | | | | |
| | HPPA | 5.00 | 5.00 | 5.00 | 5.00 | | | | | | |
| Polyfunctional (meth)-acrylate | 2PGA | 20.00 | 20.00 | 10.00 | 5.00 | 15.00 | 10.00 | 10.00 | 10.00 | 10.00 | 10.00 |
| | 3PGA | 5.00 | 10.00 | | | 5.00 | | | | | |
| | DMTCDDA | | 5.00 | | | | 10.00 | 10.00 | 10.00 | 10.00 | 10.00 |
| | DPHA | 5.00 | 5.00 | 5.00 | 5.00 | 5.00 | 5.00 | 5.00 | 5.00 | 5.00 | 5.00 |
| Photopolymerization | 819 | 5.00 | 5.00 | 5.00 | 5.00 | 5.00 | 5.00 | 5.00 | 5.00 | 5.00 | 5.00 |
| | TPO | 5.00 | 5.00 | 5.00 | 5.00 | 5.00 | 5.00 | 5.00 | 5.00 | 5.00 | 5.00 |

TABLE 5-continued

| Component name | Abbreviation | Example 1 | Example 2 | Example 3 | Example 4 | Example 5 | Example 6 | Example 7 | Example 8 | Example 9 | Example 10 |
|---|---|---|---|---|---|---|---|---|---|---|---|
| initiator | DETX-S | 2.00 | 2.00 | 2.00 | 2.00 | 2.00 | 2.00 | 2.00 | 2.00 | 2.00 | 2.00 |
| Pigment | Black | 2.00 | 2.00 | 2.00 | 2.00 | 2.00 | 2.00 | 2.00 | 2.00 | 2.00 | 2.00 |
| Dispersant | SOL36000 | 1.00 | 1.00 | 1.00 | 1.00 | 1.00 | 1.00 | 1.00 | 1.00 | 1.00 | 1.00 |
| Total | | 100.00 | 100.00 | 100.00 | 100.00 | 100.00 | 100.00 | 100.00 | 100.00 | 100.00 | 100.00 |

TABLE 6

| Component name | Abbreviation | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Acryl vinyl-containing monomer | VEEA | 20.00 | 20.00 | 20.00 | 20.00 | 20.00 | 20.00 | 20.00 | 20.00 | 20.00 | 20.00 |
| Monofunctional (meth)-acrylate | LA | 10.00 | | | | | | | | | |
| | MEDOL10 | | 10.00 | | | | | | | | |
| | THFOA | | | 10.00 | | | | | | | |
| | IBXA | | | | 10.00 | | | | | | |
| | 4HBA | | | | | 10.00 | | | | | |
| | ACMO | | | | | | 10.0 | | | | |
| | PEA | 30.00 | 30.00 | 30.00 | 30.00 | 30.00 | 30.00 | 40.00 | 30.00 | 30.00 | 30.00 |
| | PDEGA | | | | | | | | 10.00 | | |
| | DCPtaA | | | | | | | | | | |
| | DCPteA | 5.00 | 5.00 | 5.00 | 5.00 | | | | | 10.00 | 10.00 |
| Polyfunctional (meth)-acrylate | 2PGA | 10.00 | 10.00 | 10.00 | 10.00 | 10.00 | 10.00 | 10.00 | 10.00 | 10.00 | 10.00 |
| | DMTCDDA | 10.00 | 10.00 | 10.00 | 10.00 | 10.00 | 10.00 | 10.00 | 10.00 | 10.00 | 10.00 |
| | DPHA | 5.00 | 5.00 | 5.00 | 5.00 | 5.00 | 5.00 | 5.00 | 5.00 | 5.00 | 5.00 |
| Photopolymerization initiator | 819 | 5.00 | 5.00 | 5.00 | 5.00 | 5.00 | 5.00 | 5.00 | 5.00 | 5.00 | 5.00 |
| | TPO | 5.00 | 5.00 | 5.00 | 5.00 | 5.00 | 5.00 | 5.00 | 5.00 | 5.00 | 5.00 |
| | DETX-S | 2.00 | 2.00 | 2.00 | 2.00 | 2.00 | 2.00 | 2.00 | 2.00 | 2.00 | 2.00 |
| Pigment | Black | 2.00 | 2.00 | 2.00 | 2.00 | 2.00 | 2.00 | 2.00 | 2.00 | 2.00 | 2.00 |
| Dispersant | SOL36000 | 1.00 | 1.00 | 1.00 | 1.00 | 1.00 | 1.00 | 1.00 | 1.00 | 1.00 | 1.00 |
| Total | | 100.00 | 100.00 | 100.00 | 100.00 | 100.00 | 100.00 | 100.00 | 100.00 | 100.00 | 100.00 |

TABLE 7

| Component name | Abbreviation | Example 21 | Example 22 | Example 23 | Example 24 | Example 25 | Example 26 | Example 27 | Example 28 | Example 29 | Example 30 |
|---|---|---|---|---|---|---|---|---|---|---|---|
| Acryl vinyl-containing monomer | VEEA | 20.00 | 20.00 | 20.00 | 20.00 | 17.00 | 17.00 | 30.00 | 27.00 | 35.00 | 27.00 |
| Monofunctional (meth)-acrylate | THFA | | | 20.00 | 20.00 | | 5.00 | | | | |
| | 4HBA | | | 10.00 | | 10.00 | | | | 15.00 | 10.00 |
| | PEA | 30.00 | 30.00 | | | 30.00 | 30.00 | 20.00 | 20.00 | 10.00 | 30.00 |
| | DCPteA | | | | 10.00 | | 10.00 | | | | 5.00 |
| | DCPteOEA | 10.00 | | | | | | | | | |
| | HPPA | | 10.00 | 10.00 | 10.00 | | 5.00 | | | | 5.00 |
| Polyfunctional (meth)-acrylate | 2PGA | 10.00 | 10.00 | 10.00 | 10.00 | 20.00 | | 20.00 | 20.00 | 10.00 | |
| | 3PGA | | | | | 10.00 | | 10.00 | 10.00 | | |
| | DMTCDDA | 10.00 | 10.00 | 10.00 | 10.00 | 5.00 | 5.00 | | 5.00 | 10.00 | 5.00 |
| | DPHA | 5.00 | 5.00 | 5.00 | 5.00 | | | 5.00 | | 5.00 | |
| | UA | | | | | 5.00 | 5.00 | | 5.00 | | 5.00 |
| Photopolymerization initiator | 819 | 5.00 | 5.00 | 5.00 | 5.00 | 4.00 | 4.00 | 5.00 | 4.00 | 5.00 | 4.00 |
| | TPO | 5.00 | 5.00 | 5.00 | 5.00 | 5.00 | 5.00 | 5.00 | 5.00 | 5.00 | 5.00 |
| | DETX-S | 2.00 | 2.00 | 2.00 | 2.00 | 1.00 | 1.00 | 2.00 | 1.00 | 2.00 | 1.00 |
| Pigment | Black | 2.00 | 2.00 | 2.00 | 2.00 | 2.00 | 2.00 | 2.00 | 2.00 | 2.00 | 2.00 |
| Dispersant | SOL36000 | 1.00 | 1.00 | 1.00 | 1.00 | 1.00 | 1.00 | 1.00 | 1.00 | 1.00 | 1.00 |
| Total | | 100.00 | 100.00 | 100.00 | 100.00 | 100.00 | 100.00 | 100.00 | 100.00 | 100.00 | 100.00 |

TABLE 8

| Component name | Abbreviation | Example 31 | Example 32 | Example 33 | Comp. Example 1 | Comp. Example 2 | Comp. Example 3 |
|---|---|---|---|---|---|---|---|
| Acryl vinyl-containing monomer | VEEA | 27.00 | 27.00 | 40.00 | | 5.00 | |
| Mono-functional (meth)-acrylate | THFA | | | | | 5.00 | |
| | 4HBA | 10.00 | | | | 5.00 | |
| | PEA | 20.00 | 20.00 | 22.00 | 10.00 | 27.00 | 30.00 |
| | DCPteA | 5.00 | | | | 5.00 | |
| | HPPA | 5.00 | | | | 5.00 | |
| Poly-functional (meth)-acrylate | 2PGA | | 20.00 | 10.00 | 30.00 | 15.00 | 20.00 |
| | 3PGA | 5.00 | 10.00 | 5.00 | 30.00 | 10.00 | 20.00 |
| | DMTCDDA | 10.00 | 5.00 | 5.00 | 10.00 | 5.00 | 10.00 |
| | DPHA | | | | 5.00 | | 5.00 |
| | UA | 5.00 | 5.00 | 5.00 | | 5.00 | |
| Photo-polymerization initiator | 819 | 4.00 | 4.00 | 4.00 | 5.00 | 4.00 | 5.00 |
| | TPO | 5.00 | 5.00 | 5.00 | 5.00 | 5.00 | 5.00 |
| | DETX-S | 1.00 | 1.00 | 1.00 | 2.00 | 1.00 | 2.00 |
| Pigment | Black | 2.00 | 2.00 | 2.00 | 2.00 | 2.00 | 2.00 |
| Dispersant | SOL36000 | 1.00 | 1.00 | 1.00 | 1.00 | 1.00 | 1.00 |
| Total | | 100.00 | 100.00 | 100.00 | 100.00 | 100.00 | 100.00 |

| Component name | Abbreviation | Comp. Example 4 | Comp. Example 5 | Comp. Example 6 | Comp. Example 7 | Comp. Example 8 |
|---|---|---|---|---|---|---|
| Acryl vinyl-containing monomer | VEEA | | | 5.00 | 20.00 | 80.00 |
| Mono-functional (meth)-acrylate | THFA | 5.00 | 5.00 | | | |
| | 4HBA | 25.00 | 15.00 | | | |
| | PEA | 27.00 | 27.00 | | 20.00 | |
| | DCPteA | 15.00 | 15.00 | | | |
| | HPPA | 10.00 | 10.00 | | | |
| Poly-functional (meth)-acrylate | 2PGA | | 10.00 | 27.00 | 20.00 | |
| | 3PGA | | | 30.00 | 10.00 | |
| | DMTCDDA | | | 10.00 | 10.00 | |
| | DPHA | | | 5.00 | 5.00 | 5.00 |
| | UA | 5.00 | 5.00 | 10.00 | | |
| Photo-polymerization initiator | 819 | 4.00 | 4.00 | 4.00 | 5.00 | 5.00 |
| | TPO | 5.00 | 5.00 | 5.00 | 5.00 | 5.00 |
| | DETX-S | 1.00 | 1.00 | 1.00 | 2.00 | 2.00 |
| Pigment | Black | 2.00 | 2.00 | 2.00 | 2.00 | 2.00 |
| Dispersant | SOL36000 | 1.00 | 1.00 | 1.00 | 1.00 | 1.00 |
| Total | | 100.00 | 100.00 | 100.00 | 100.00 | 100.00 |

TABLE 9

| Component name | Abbreviation | Comp. Example 9 | Comp. Example 10 | Comp. Example 11 | Comp. Example 12 | Comp. Example 13 | Comp. Example 14 | Comp. Example 15 |
|---|---|---|---|---|---|---|---|---|
| Acryl vinyl-containing monomer | VEEA | 45.00 | 5.00 | 30.00 | 17.00 | 70.00 | 55.00 | 20.00 |
| Mono-functional (meth)-acrylate | THFA | | 5.00 | 5.00 | 5.00 | | | |
| | 4HBA | | 25.00 | 5.00 | 15.00 | | | 10.00 |
| | PEA | 20.00 | 30.00 | 30.00 | 30.00 | 15.00 | 30.00 | 30.00 |
| | DCPteA | | 15.00 | 5.00 | 10.00 | | | |
| | HPPA | | 7.00 | 5.00 | 10.00 | | | |
| Other mono-functional | NVF | | | | | | | |
| | NVC | | | | | | | |
| Poly-functional (meth)-acrylate | 2PGA | 7.00 | | | | | | |
| | 3PGA | 5.00 | | 2.50 | | | | 2.50 |
| | DMTCDDA | 5.00 | | | | | | |
| | DPHA | | | 2.50 | | | | 2.50 |
| | UA | 5.00 | | | | | | |
| Other poly-functional | TEG-DVE | | | | | | | 20.00 |
| Photo- | 819 | 4.00 | 4.00 | 5.00 | 4.00 | 5.00 | 5.00 | 5.00 |

TABLE 9-continued

| | | | | | | | | |
|---|---|---|---|---|---|---|---|---|
| polymerization initiator | TPO | 5.00 | 5.00 | 5.00 | 5.00 | 5.00 | 5.00 | 5.00 |
| | DETX-S | 1.00 | 1.00 | 2.00 | 1.00 | 2.00 | 2.00 | 2.00 |
| Pigment | Black | 2.00 | 2.00 | 2.00 | 2.00 | 2.00 | 2.00 | 2.00 |
| Dispersant | SOL36000 | 1.00 | 1.00 | 1.00 | 1.00 | 1.00 | 1.00 | 1.00 |
| Total | | 100.00 | 100.00 | 100.00 | 100.00 | 100.00 | 100.00 | 100.00 |

| | Component name | Abbreviation | Comp. Example 16 | Comp. Example 17 | Comp. Example 18 | Comp. Example 19 | Reference Example 1 |
|---|---|---|---|---|---|---|---|
| | Acryl vinyl-containing monomer | VEEA | 30.00 | 10.00 | 20.00 | 20.00 | 10.00 |
| | Mono-functional | THFA | | 5.00 | | | 5.00 |
| | | 4HBA | | 15.00 | | | 15.00 |
| | (meth)-acrylate | PEA | 15.00 | 30.00 | 10.00 | 10.00 | 30.00 |
| | | DCPteA | | 10.00 | | | 10.00 |
| | | HPPA | | 5.00 | | | 5.00 |
| | Other mono-functional | NVF | | | 30.00 | | |
| | | NVC | | | | 30.00 | |
| | Poly-functional | 2PGA | 20.00 | | 10.00 | 10.00 | |
| | | 3PGA | 10.00 | | | | |
| | (meth)-acrylate | DMTCDDA | 5.00 | 10.00 | 10.00 | 10.00 | 10.00 |
| | | DPHA | 5.00 | | 5.00 | 5.00 | |
| | | UA | | 2.00 | | | 5.00 |
| | Other poly-functional | TEG-DVE | | | | | |
| | Photo-polymerization initiator | 819 | 5.00 | 4.00 | 5.00 | 5.00 | 4.00 |
| | | TPO | 5.00 | 5.00 | 5.00 | 5.00 | 5.00 |
| | | DETX-S | 2.00 | 1.00 | 2.00 | 2.00 | 1.00 |
| Pigment | | Black | 2.00 | 2.00 | 2.00 | 2.00 | |
| Dispersant | | SOL36000 | 1.00 | 1.00 | 1.00 | 1.00 | |
| Total | | | 100.00 | 100.00 | 100.00 | 100.00 | 100.00 |

[Evaluation Item]

The photocurable ink composition for ink jet recording prepared in each of the examples and the comparative examples was evaluated with respect to curability, extensibility, and curing wrinkles by methods described below.

(1. Curability)

An ink jet printer PX-G5000 (trade name, manufactured by Seiko Epson Corporation) was used, and a nozzle array was filled with the photocurable ink composition for ink jet recording of each of the examples and the comparative examples. A solid pattern image (recording resolution: 720 dpi×720 dpi) was printed on a PET film (LUMIRROR 125E20 (trade name) manufactured by Toray Industries Inc.) at normal temperature and normal pressure so that ink dots had a medium diameter and the thickness of a coating film on a printed matter was 10 μm. Next, the solid pattern image was cured by irradiating the printed PET film, which was discharged from the printer, with ultraviolet light with an irradiation intensity of 1,500 mW/cm$^2$, a wavelength of 395 nm, and an irradiation energy of 200 mJ/cm$^2$ using UV-LED of an ultraviolet irradiation apparatus. As a result, a recorded material having the solid pattern image printed on the PET film was formed. The "solid pattern image" was an image in which dots were recorded in all pixels in a minimum recording unit region defined by the recording resolution.

The irradiation energy (mJ/cm$^2$) was determined by measuring the irradiation intensity (mW/cm$^2$) on a surface irradiated from the light source and multiplying the irradiation intensity by the irradiation duration time (s). The irradiation intensity was measured using an ultraviolet ray intensity meter UM-10 and a light receiving unit UM-400 (both manufactured by KONICA MINOLTA SENSING, INC.).

The curability of the coating film was evaluated using as an index the irradiation energy when it was tack-free. Whether or not a coating film became tack-free was determined under conditions described below. That is, it was determined whether or not an ink adhered to a cotton-tipped swab or whether or not an ink cured product on a recording medium was scratched. When the ink did not adhere to the cotton-tipped swab and the ink cured product on the recording medium was not scratched, the coating film was determined as being "tack-free". In this case, the cotton-tipped swab used was a Johnson cotton-tipped swab manufactured by Johnson & Johnson Co. Ltd. The number of rubbing cycles was 10, and the rubbing strength was a 100-g load.

The evaluation criteria were as follows. The evaluation results are shown in the tables below.

A: Irradiation energy of 200 mJ/cm$^2$ or less when the film was tack-free

B: Irradiation energy of over 200 mJ/cm$^2$ and 300 mJ/cm$^2$ or less when the film was tack-free C: Irradiation energy of over 300 mJ/cm$^2$ when the film was tack-free (2. Extensibility)

The photocurable ink composition for ink jet recording of each of the examples and the comparative examples was applied over the whole surface of a test piece IJ-180-10 of 10 mm×100 mm (trade name, manufactured by 3M Corporation, PVC (vinyl chloride) medium) so that the thickness was 10 μm. The ink of the coating film was cured by irradiation with ultraviolet light with 200 mJ/cm$^2$ using UV-LED having an emission peak wavelength of 395 nm, thereby forming a cured film.

The test piece with the cured film formed thereon was stretched from both sides thereof in the longitudinal direction using a tensile tester TENSILON (trade name, manufactured by ORIENTEC Co., Ltd.), and elongation percentage (assumed as "100%" when stretched two times) was measured when a crack occurred in the cured film.

The evaluation criteria were as described below. The evaluation results are shown in the tables below.
A: Elongation percentage of 100% or more
B: Elongation percentage of over 50% and less than 100%
C: Elongation percentage of 50% or less
(3. Curing wrinkle)
Evaluation was made using as an index a degree of wrinkling on a surface of the solid pattern image formed after the completion of curing for evaluation of curability described above. The degree of wrinkling was observed visually and with an optical microscope.

The method for confirming a tack-free state, the solid pattern image, and measurement and calculation of irradiation energy and irradiation intensity were as described above in the evaluation item "Curability".

The evaluation criteria were as follows. The evaluation results are shown in the tables below.
A: No wrinkle was observed visually and microscopically.
B: No wrinkle was observed visually, but wrinkles were observed microscopically.
C: Wrinkles were visually observed.

TABLE 10

| Evaluation result | Example 1 | Example 2 | Example 3 | Example 4 | Example 5 | Example 6 | Example 7 | Example 8 | Example 9 | Example 10 |
|---|---|---|---|---|---|---|---|---|---|---|
| Curability | B | B | B | A | A | A | A | A | A | A |
| Extensibility | A | B | A | A | A | A | A | A | A | A |
| Curing wrinkle | A | A | B | B | A | A | A | A | A | A |

TABLE 11

| Evaluation result | Example 11 | Example 12 | Example 13 | Example 14 | Example 15 | Example 16 | Example 17 | Example 18 | Example 19 | Example 20 |
|---|---|---|---|---|---|---|---|---|---|---|
| Curability | A | A | A | A | A | A | A | A | A | A |
| Extensibility | A | A | A | A | A | A | A | A | A | A |
| Curing wrinkle | A | A | A | A | A | A | A | A | A | A |

TABLE 12

| Evaluation result | Example 21 | Example 22 | Example 23 | Example 24 | Example 25 | Example 26 | Example 27 | Example 28 | Example 29 | Example 30 |
|---|---|---|---|---|---|---|---|---|---|---|
| Curability | A | A | B | B | A | A | A | A | A | A |
| Extensibility | A | A | A | A | B | A | B | B | B | B |
| Curing wrinkle | A | A | A | A | A | B | A | A | B | B |

TABLE 13

| Evaluation result | Example 31 | Example 32 | Example 33 | Comp. Example 1 | Comp. Example 2 | Comp. Example 3 | Comp. Example 4 | Comp. Example 5 | Comp. Example 6 | Comp. Example 7 | Comp. Example 8 |
|---|---|---|---|---|---|---|---|---|---|---|---|
| Curability | A | A | B | C | C | C | C | C | C | B | A |
| Extensibility | A | B | B | C | B | C | A | A | C | C | C |
| Curing wrinkle | A | A | B | B | B | B | C | B | A | A | C |

TABLE 14

| Evaluation result | Comp. Example 9 | Comp. Example 10 | Comp. Example 11 | Comp. Example 12 | Comp. Example 13 | Comp. Example 14 | Comp. Example 15 | Comp. Example 16 | Comp. Example 17 | Comp. Example 18 | Comp. Example 19 |
|---|---|---|---|---|---|---|---|---|---|---|---|
| Curability | B | C | A | A | A | A | C | A | A | A | A |
| Extensibility | B | A | A | A | C | C | A | C | A | A | A |
| Curing wrinkle | C | C | C | C | C | C | C | A | C | C | C |

TABLE 15

| Evaluation result | Reference Example 1 | Reference Example 2 | Reference Example 3 |
|---|---|---|---|
| Curability | A | A | A |
| Extensibility | B | A | A |
| Curing wrinkle | A | A | A |

The above results indicate that the ink composition containing the polymerizable compounds and the photopolymerization initiator, the polymerizable compounds including 10 to 40% by mass of the vinyl ether group-containing (meth)acrylate represented by the general formula (I), 20 to 60% by mass of the monofunctional (meth)acrylate, and 10 to 40% by mass of the polyfunctional (meth)acrylate is, as compared with the ink composition for which this is not true, excellent in curability and extensibility of a cured film and capable of preventing the occurrence of curing wrinkles.

In detailed consideration, it was found that the ink composition containing the vinyl ether group-containing (meth)acrylate represented by the general formula (I) is, as compared with the ink composition not containing this, excellent in curability (each of the examples and Comparative Examples 1 and 3 to 5). Also, it was found that the ink composition containing 10% by mass or more (40% by mass or less) of the vinyl ether group-containing (meth)acrylate is, as compared with the ink composition for which this is not true, excellent in curability (refer to each example and Comparative Examples 2, 6, and 10). Further, it was found that the ink composition containing 40% by mass or less (10% by mass or more) of the vinyl ether group-containing (meth)acrylate is, as compared with the ink composition for which this is not true, excellent in the prevention of occurrence of curing wrinkles and also satisfactory in curability and extensibility of the cured film (refer to each example and Comparative Examples 9, 8, 13, and 14).

In addition, it was found that the ink composition containing the monofunctional (meth)acrylate is, as compared with the ink composition not containing this, excellent at least in extensibility of the cured film and is more excellent in curability and capable of preventing the occurrence of curing wrinkles when a thick film is cured (refer to each example and Comparative Examples 6 and 8). Further, it was found that the ink composition containing 20% by mass or more (60% by mass or less) of the monofunctional (meth)acrylate is, as compared with the ink composition for which this is not true, excellent in extensibility of the cured film (refer to each example and Comparative Examples 16, 1, and 13).

Further, it was found that the ink composition containing 20% by mass or more (60% by mass or less) of the monofunctional (meth)acrylate is capable of preventing the occurrence of curing wrinkles as compared with the ink composition containing 20% by mass or more (60% by mass or less) of the monofunctional polymerizable monomers but containing less than 20% by mass of the monofunctional (meth)acrylate (refer to each example and Comparative Examples 18 and 19). This reveals that Comparative Examples 18 and 19 have good results of extensibility but poor results of curing wrinkles. This result is estimated to be due to NVF and NVC. Specifically, NVF and NVC have vinyl groups as polymerizable reactive groups and are thus very excellent in reactivity as compared with acryl group-containing monomers (assuming that they are used in combination with acrylate). Therefore, it is supposed that curing unevenness easily occurs due to a difference in reaction rate between vinyl groups and acryl groups, thereby easily causing wrinkles. Similarly, VEEA contains a vinyl ether group and thus may cause curing wrinkles due to a difference in reaction rate from an acryl group when added excessively (Comparative Example 13).

Further, it was found that the ink composition containing 60% by mass or less (20% by mass or more) of the monofunctional (meth)acrylate is, as compared with the ink composition for which this is not true, capable of preventing the occurrence of curing wrinkles (refer to each example and Comparative Examples 17, 4, 5, 10, and 12).

In addition, it was found that the ink composition containing the polyfunctional (meth)acrylate is, as compared with the ink composition not containing this, excellent in at least the prevention of the occurrence of curing wrinkles and good in curability and extensibility of the cured film (refer to each example and Comparative Examples 10 and 12 to 14). Further, it was found that the ink composition containing 10% by mass or more (40% by mass or less) of the polyfunctional (meth)acrylate is, as compared with the ink compositions for which this is not true, capable of preventing the occurrence of curing wrinkles (refer to each example and Comparative Examples 11, 4, and 8). Further, it was found that the ink composition containing 10% by mass or more (40% by mass or less) of the polyfunctional (meth)acrylate is capable of preventing the occurrence of curing wrinkles and is excellent in curability as compared with the ink composition containing 10% by mass or more (40% by mass or less) of the polyfunctional polymerizable compounds but containing less than 10% by mass of the polyfunctional (meth)acrylate (refer to each example and Comparative Example 15). Further, it was found that the ink composition containing 40% by mass or less (10% by mass or more) of the polyfunctional (meth)acrylate is, as compared with the ink composition for which this is not true, excellent in extensibility of the cured film and curability (refer to each example and Comparative Examples 7, 1, 3, and 6).

Further, although Comparative Example 17 is not excellent in the prevention of the occurrence of curing wrinkles, Reference Example 1 not containing the pigment and the dispersant of Comparative Example 17 is excellent in the prevention of the occurrence of curing wrinkles but cannot be used for recording color images because of the absence of the colorant. This reveals that the ink composition of each of the examples is excellent in curability, extensibility, and the prevention of the occurrence of curing wrinkles and can be used for recording color images.

Reference Examples 2 and 3 using the ink compositions of Comparative Examples 11 and 17, respectively, were evaluated by the same method as in Comparative Examples 11 and 17 except that each of the evaluation samples was formed by irradiation using a metal halide lamp (irradiation intensity: 1,000 mW/m$^2$) in place of UV-LED. Although Comparative Examples 11 and 17 were not excellent in the prevention of occurrence of curing wrinkles, Reference Examples 2 and 3 were excellent in the prevention of occurrence of curing wrinkles. However, the PET film was deformed due to the heat generated from the metal halide. This reveals that the ink composition of each of the examples is excellent in curability, extensibility, and the prevention of the occurrence of curing wrinkles and can be used for forming an excellent recorded material without thermal deformation of a film by using LED for irradiation.

The entire disclosure of Japanese Patent Application No.: 2012-008704, filed Jan. 19, 2012 and 2011-151770, filed Jul. 8, 2011 and 2011-200809, filed Sep. 14, 2011 are expressly incorporated by reference herein.

What is claimed is:

1. A photocurable ink composition for ink jet recording, comprising:
    polymerizable compounds;
    a photopolymerization initiator; and
    a colorant,
    wherein the polymerizable compounds include a vinyl ether group-containing (meth)acrylate represented by general formula (I):

$$CH_2=CR^1-COO-R^2-O-CH=CH-R^3 \quad (I)$$

(wherein $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms) and phenoxyethyl (meth)acrylate,
    wherein the content of the phenoxyethyl (meth)acrylate is 9 to 60% by mass relative to the total mass of the ink composition,
    wherein the photopolymerization initiator contains 7% by mass or more of an acylphosphine oxide compound relative to the total mass of the ink composition,
    wherein the acylphosphine oxide compound contains 4% by mass or more of a bisacylphosphine oxide compound relative to the total mass of the ink composition.

2. The photocurable ink composition for ink jet recording according to claim 1, wherein the photopolymerization initiator contains 7 to 15% by mass of an acylphosphine oxide compound relative to the total mass of the ink composition.

3. The photocurable ink composition for ink jet recording according to claim 1, wherein the photopolymerization initiator contains 10 to 15% by mass of an acylphosphine oxide compound relative to the total mass of the ink composition.

4. The photocurable ink composition for ink jet recording according to claim 1, wherein the vinyl ether group-containing (meth)acrylate is 2-(vinyloxyethoxy)ethyl (meth)acrylate.

5. The photocurable ink composition for ink jet recording according to claim 1, wherein the content of the vinyl ether group-containing (meth)acrylate is 10 to 60% by mass relative to the total mass of the ink composition.

6. The photocurable ink composition for ink jet recording according to claim 1, wherein the ink composition is cured by irradiation with ultraviolet light with an emission peak wavelength in a range of 350 to 420 nm and an irradiation energy of 300 mJ/cm² or less.

7. An inkjet recording method comprising:
    ejecting the photocurable ink composition for ink jet recording according to claim 1 onto a recording medium; and
    curing the ejected photocurable ink composition for ink jet recording by ultraviolet irradiation.

8. A photocurable ink composition for ink jet recording, comprising:
    polymerizable compounds;
    a photopolymerization initiator; and
    a colorant,
    wherein the polymerizable compounds include, relative to total mass of
    the ink composition, 10-40% by mass of a vinyl ether group-containing (meth)acrylate represented by general formula (I):

$$CH_2=CR^1-COO-R^2-O-CH=CH-R^3 \quad (1)$$

(wherein $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms), 20 to 60% by mass of a monofunctional (meth)acrylate (excluding the vinyl ether group containing (meth)acrylate), and 10 to 40% by mass of a polyfunctional (meth)acrylate,
    wherein the photopolymerization initiator contains 7% by mass or more of an acylphosphine oxide compound relative to the total mass of the ink composition,
    wherein the acylphosphine oxide compound contains 4% by mass or more of a bisacylphosphine oxide compound relative to the total mass of the ink composition.

9. The photocurable ink composition for ink jet recording according to claim 8, wherein the monofunctional (meth) acrylate contains 10 to 60% by mass of phenoxyethyl (meth) acrylate relative to the total mass of the ink composition.

10. The photocurable ink composition for ink jet recording according to claim 8, wherein the content of the monofunctional (meth)acrylate is 20 to 40% by mass relative to the total mass of the ink composition.

11. The photocurable ink composition for ink jet recording according to claim 8, wherein the content of the polyfunctional (meth)acrylate is 20 to 30% by mass relative to the total mass of the ink composition.

12. The photocurable ink composition for ink jet recording according to claim 8, wherein the ink composition is cured by irradiation with ultraviolet light with an emission peak wavelength in a range of 350 to 420 nm and an irradiation energy of 300 mJ/cm² or less.

13. The photocurable ink composition for ink jet recording according to claim 8, wherein the vinyl ether group-containing (meth)acrylate is 2-(vinyloxyethoxy)ethyl (meth)acrylate.

14. The photocurable ink composition for ink jet recording according to claim 8, wherein the primary skin irritation index of the monofunctional (meth)acrylate is 0 to 4.

15. An ink jet recording method using the photocurable ink composition for ink jet recording according to claim 8, the method comprising:
    causing the photocurable ink composition for ink jet recording to adhere to a recording medium; and
    irradiating, using a light-emitting diode, the adhering photocurable ink composition for ink jet recording with ultraviolet light with an emission peak wavelength in a range of 350 to 420 nm.

16. The ink jet recording method according to claim 15, wherein the irradiation energy of the ultraviolet light is 300 mJ/cm² or less.

* * * * *